United States Patent
Kijima et al.

(10) Patent No.: US 10,773,313 B2
(45) Date of Patent: Sep. 15, 2020

(54) TURRET TOOL REST AND MACHINE TOOL

(71) Applicant: Yamazaki Mazak Corporation, Niwa-gun (JP)

(72) Inventors: Tetsuya Kijima, Niwa-gun (JP); Koji Abe, Niwa-gun (JP); Koichi Kawamura, Niwa-gun (JP); Takuya Il, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 517 days.

(21) Appl. No.: 15/166,264

(22) Filed: May 27, 2016

(65) Prior Publication Data

US 2017/0023926 A1 Jan. 26, 2017

Related U.S. Application Data

(63) Continuation of application No. PCT/JP2015/070701, filed on Jul. 21, 2015.

(51) Int. Cl.
*B23B 29/32* (2006.01)
*B23Q 11/00* (2006.01)
(Continued)

(52) U.S. Cl.
CPC ............ *B23B 29/323* (2013.01); *B23B 3/162* (2013.01); *B23Q 5/10* (2013.01); *B23Q 16/06* (2013.01);
(Continued)

(58) Field of Classification Search
CPC ............ Y10T 29/5154; Y10T 29/5155; Y10T 29/5165; Y10T 29/5167; Y10T 408/93;
(Continued)

(56) References Cited

U.S. PATENT DOCUMENTS 3,726,363 A * 4/1973 Sussman ............... B23Q 11/103
184/39.1
5,097,718 A * 3/1992 Sahara ..................... B23Q 5/56
384/255
(Continued)

FOREIGN PATENT DOCUMENTS

CN 100496828 C 6/2009
CN 101264580 B 10/2011
(Continued)

OTHER PUBLICATIONS

EPO Machine Translation of DE 19838505A1—Link, Helmut Friedrich; "Tool revolving unit for CNC controlled turning machine simulating Y axis with tool spindle having C-axis with feed rotation movement"; Mar. 2, 2000. (Year: 2000).*
(Continued)

*Primary Examiner* — Erica E Cadugan
*Assistant Examiner* — Michael Vitale
(74) *Attorney, Agent, or Firm* — Mori & Ward, LLP

(57) ABSTRACT

A turret tool rest includes a main shaft, a turret turning shaft, a turret, a joint base, a mill housing connection shaft, and an engagement member. The main shaft rotates a tool. A part of the main shaft is provided in the turret turning shaft. The turret turning shaft has a first coupling hole. The turret is connected to the turret turning shaft via which the turret is rotated. The joint base has a second coupling hole. The mill housing connection shaft is connected to the joint base. The mill housing connection shaft is provided between the main shaft and the turret turning shaft. Each of the mill housing connection shaft, the joint base, the part of the main shaft, and the turret turning shaft are disposed to rotate around a rotation axis of the turret. The engagement member moves in the first coupling hole and the second coupling hole.

20 Claims, 18 Drawing Sheets

(51) Int. Cl.
*B23Q 39/02* (2006.01)
*B23Q 5/10* (2006.01)
*B23Q 16/06* (2006.01)
*B23B 3/16* (2006.01)
*G05B 19/402* (2006.01)
*B23Q 39/00* (2006.01)
*B23Q 11/10* (2006.01)

(52) U.S. Cl.
CPC ........... *B23Q 39/02* (2013.01); *G05B 19/402* (2013.01); *B23Q 11/10* (2013.01); *B23Q 2039/004* (2013.01); *B23Q 2039/008* (2013.01); *B23Q 2220/002* (2013.01); *B23Q 2716/02* (2013.01); *G05B 2219/45141* (2013.01); *G05B 2219/50016* (2013.01); *Y10T 29/5155* (2015.01); *Y10T 29/5167* (2015.01); *Y10T 74/1494* (2015.01)

(58) Field of Classification Search
CPC . Y10T 409/307672; Y10T 409/308232; Y10T 409/308512; B23B 29/323; B23C 1/12; B23Q 2220/002
USPC ..... 29/39, 40, 48.5 A, 48.5 R; 409/201, 211, 409/216; 408/236
See application file for complete search history.

(56) References Cited

U.S. PATENT DOCUMENTS

| | | | | |
|---|---|---|---|---|
| 5,265,505 | A * | 11/1993 | Frechette | B23Q 1/0018 29/39 |
| 6,279,219 | B1 * | 8/2001 | Ohsawa | B23P 19/04 29/407.01 |
| 6,862,786 | B2 * | 3/2005 | Kato | B23Q 1/38 29/38 B |
| 7,475,463 | B1 * | 1/2009 | Chang | B23Q 5/04 29/40 |
| 8,677,584 | B2 * | 3/2014 | Aoyagi | B23Q 11/10 29/39 |
| 2003/0221525 | A1 | 12/2003 | Katoh et al. | |
| 2006/0254384 | A1 | 11/2006 | Lu | |
| 2008/0086861 | A1 * | 4/2008 | Neo | B23B 29/323 29/40 |
| 2011/0154963 | A1 * | 6/2011 | Aoyagi | B23Q 16/102 82/159 |
| 2014/0114465 | A1 | 4/2014 | Terada et al. | |

FOREIGN PATENT DOCUMENTS

| | | | | |
|---|---|---|---|---|
| DE | 19838505 A1 | | 3/2000 | |
| GB | 2275631 A | * | 9/1994 | ........... B23B 29/323 |
| JP | 03066504 A | * | 3/1991 | |
| JP | 03-228506 | | 10/1991 | |
| JP | 04-41102 | | 2/1992 | |
| JP | 05-51513 U | | 7/1993 | |
| JP | 06170618 A | * | 6/1994 | |
| JP | 2008-93780 | | 4/2008 | |
| WO | WO 2012/105028 | | 8/2012 | |

OTHER PUBLICATIONS

The International Preliminary Report on Patentability (Chapter I) with translation of Written Opinion for corresponding International Application No. PCT/JP2015/070701, dated Jan. 23, 2018.
International Search Report for corresponding International Application No. PCT/JP2015/070701, dated Oct. 6, 2015.
Written Opinion for corresponding International Application No. PCT/JP2015/070701, dated Oct. 6, 2015.
Extended European Search Report for corresponding EP Application No. 15866384.9-1702, dated Nov. 20, 2017.
Chinese Office Action for corresponding CN Application No. 201580001849.3, dated Dec. 5, 2016.

* cited by examiner

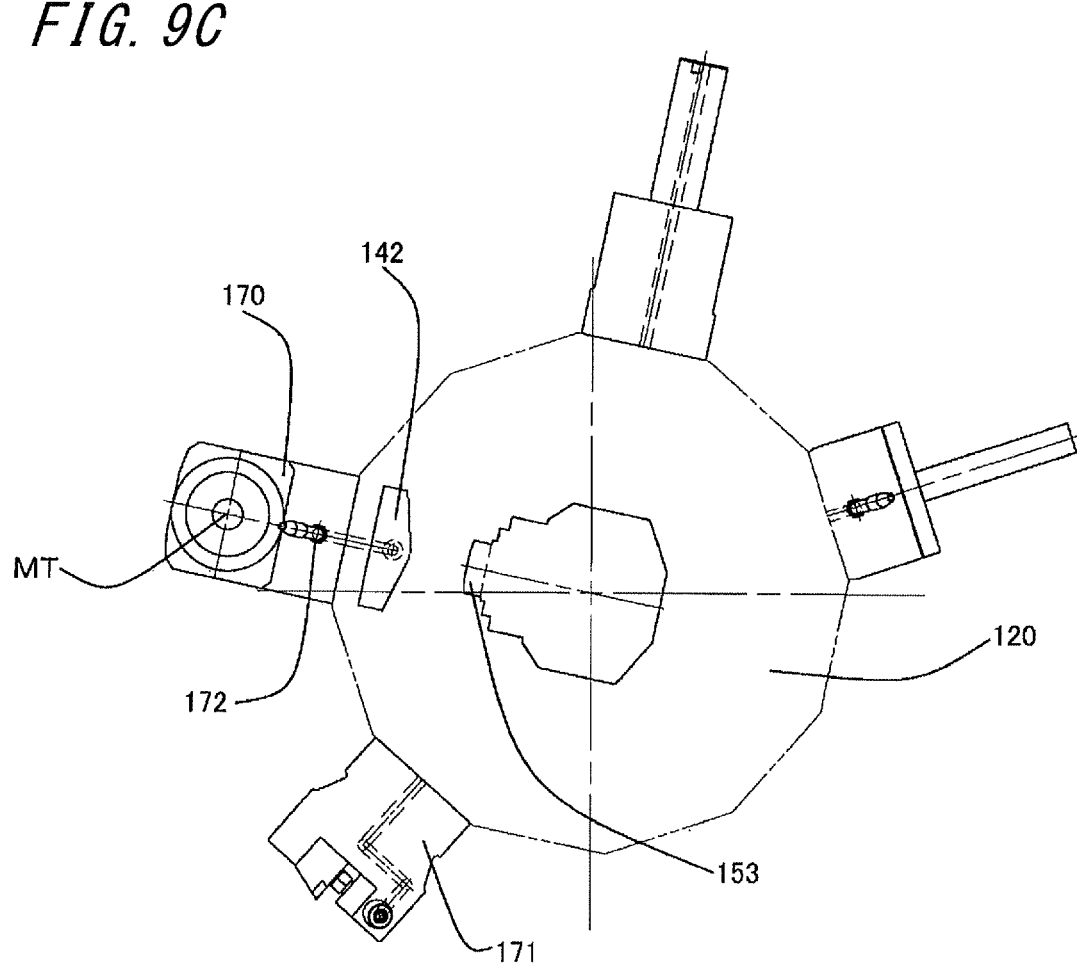

TURRET TOOL REST AND MACHINE TOOL

CROSS-REFERENCE TO RELATED APPLICATIONS

The present application is a continuation application of International Application No. PCT/JP2015/070701, filed Jul. 21, 2015. The contents of this application are incorporated herein by reference in their entirety.

BACKGROUND OF THE INVENTION

Field of the Invention

The present invention relates to a turret tool rest and machine tool.

Discussion of the Background

Conventionally, there have been known combined processing machines in which a mill axis and a Y axis are added to an NC lathe provided with a turret to which a plurality of tools are attached (refer to Japanese Unexamined Patent Application Publication No. 03-228506, for example). In the combined processing machines, when a turret turning axis is defined as an X axis, an axis in which a turret tool rest is moved in a direction perpendicular to the X axis is defined as a Z axis, and an axis perpendicular to both the X axis and the Z axis is defined as the Y axis, turn of the turret and movement in the Z-axis direction of the turret tool rest are combined while rotating a rotary tool to enable milling control in the Y-axis direction.

Such a combined processing machine makes it possible to perform the milling control in the Y-axis direction without providing a driving device in the Y-axis direction which relatively moves a workpiece and the turret tool rest.

The combined processing machine described in Japanese Unexamined Patent Application Publication No. 03-228506 employs a mechanism in which an annular piston which is externally fitted to a turret turning shaft of the turret is interposed between the turret turning shaft and a tool rest body, and the piston is moved in an axial direction of the turret turning shaft so as to be fixed in a contact manner to enable relative rotation between the turret turning shaft and the piston and the tool rest body while maintaining the rotation of the rotary tool.

SUMMARY OF THE INVENTION

According to a first aspect of the present invention, a turret tool rest includes a main shaft for rotating a tool, a mill housing, a turret turning shaft, a turret, a joint base, and a turret base. The mill housing includes a mill housing connection shaft into which the main shaft is inserted. The mill housing connection shaft is inserted into the turret turning shaft. One end of the turret turning shaft is fixed to the turret. The joint base is fixed to one end of the mill housing connection shaft. The turret base is configured to support the turret turning shaft. The mill housing is disposed inside the turret. The joint base includes an engagement mechanism configured to switch between coupling to the turret base and coupling to the turret turning shaft.

According to a second aspect of the present invention, a turret tool rest includes a main shaft, a turret turning shaft, a turret, a joint base, a mill housing connection shaft, and an engagement member. The main shaft rotates a tool. A part of the main shaft is provided in the turret turning shaft. The turret turning shaft has a first coupling hole. The turret is connected to the turret turning shaft via which the turret is rotated. The joint base has a second coupling hole. The mill housing connection shaft is connected to the joint base. The mill housing connection shaft is provided between the main shaft and the turret turning shaft. Each of the mill housing connection shaft, the joint base, the part of the main shaft, and the turret turning shaft are disposed to rotate around a rotation axis of the turret. The engagement member moves in the first coupling hole and the second coupling hole.

According to a third aspect of the present invention, a machine tool includes a turret tool rest, a workpiece holding device, and an NC control device. The turret tool rest includes a main shaft, a turret turning shaft, a turret, a joint base, a mill housing connection shaft, and an engagement member. The main shaft rotates a tool. A part of the main shaft is provided in the turret turning shaft. The turret turning shaft has a first coupling hole. The turret is connected to the turret turning shaft via which the turret is rotated. The joint base has a second coupling hole. The mill housing connection shaft is connected to the joint base. The mill housing connection shaft is provided between the main shaft and the turret turning shaft. Each of the mill housing connection shaft, the joint base, the part of the main shaft, and the turret turning shaft are disposed to rotate around a rotation axis of the turret. The engagement member moves in the first coupling hole and the second coupling hole. The workpiece holding device holds a workpiece. The NC control device controls the turret tool rest and the workpiece holding device to move close to or separate from each other in a first direction. The NC control device controls the turret tool rest to move back and forth in a second direction substantially perpendicular to the first direction. The NC control device moves the turret tool rest in the first direction and rotates the turret tool rest so as to control a position of the tool in a third direction substantially perpendicular to the first direction and the second direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9C is a schematic diagram showing a case in which milling including Y-direction control is performed using the milling tool on the turret tool rest according to the first embodiment and showing the inside of the turret in FIG. 9B in outline;

DESCRIPTION OF THE EMBODIMENTS

Figure 1:
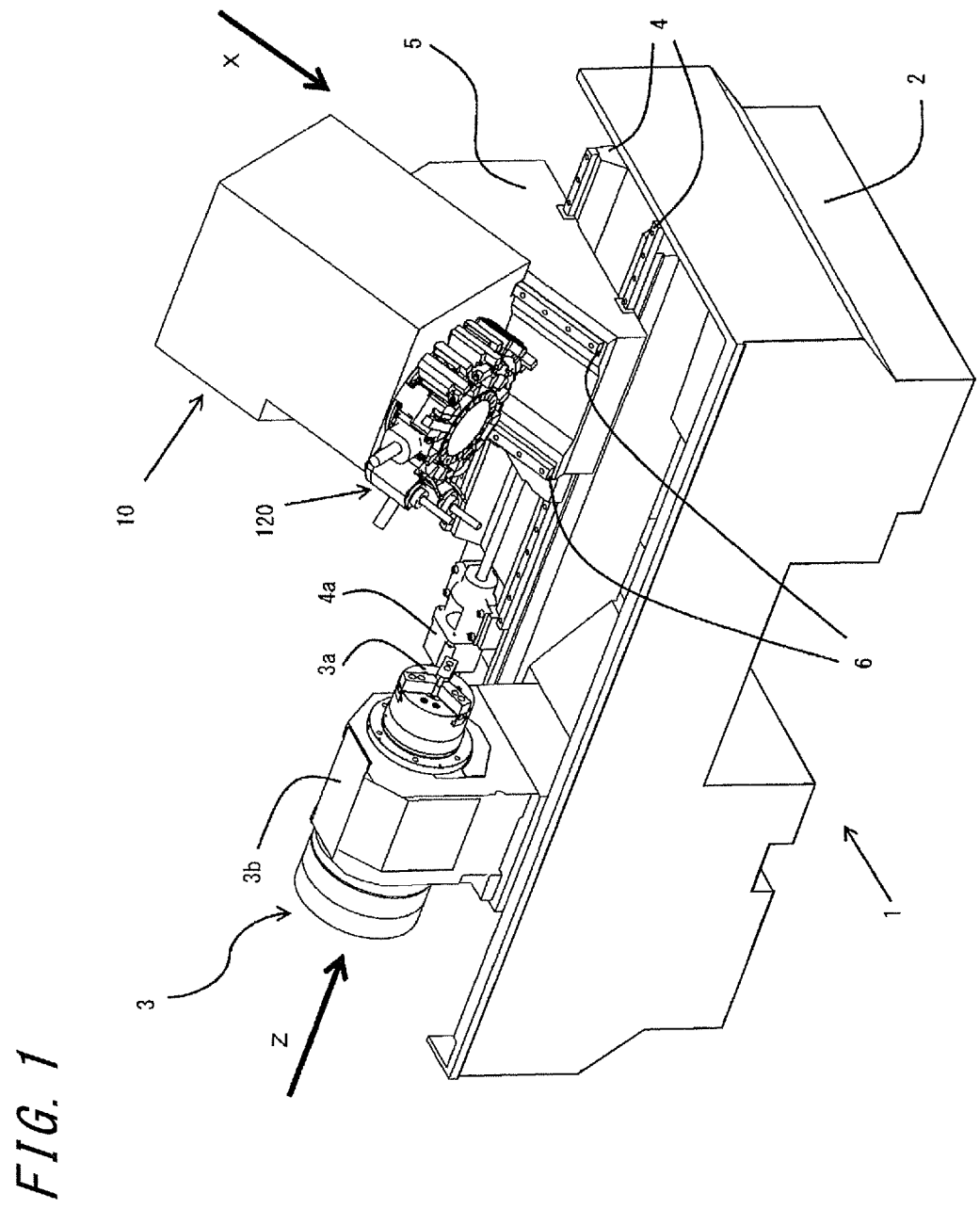
FIG. 1 is a perspective view showing a machine tool provided with a turret tool rest according to a first embodiment of the present invention.

The embodiments will now be described with reference to the accompanying drawings, wherein like reference numerals designate corresponding or identical elements throughout the various drawings.

First Embodiment

A turret tool rest according to a first embodiment of the present invention and a machine tool provided with the turret tool rest will be described in outline with reference to FIGS. 1 to 3.

FIG. 1 is a perspective view showing the machine tool provided with the turret tool rest according to the first embodiment of the present invention. FIG. 2 is a side view of the machine tool viewed from a Z direction of FIG. 1

As shown in FIG. 1, the machine tool 1 to which the turret tool rest according to the first embodiment of the present invention is applied is provided with a base 2, a workpiece holding device 3 which is disposed on the base 2, a Z-axis rail 4 which is laid on the upper face of the base 2 in a direction approaching or separating from the workpiece holding device 3, a carriage 5 which slides on the Z-axis rail 4, an X-axis rail 6 which is laid on the upper face of the carriage 5 in a direction perpendicular to the Z-axis rail 4, a turret tool rest 10 which sides on the X-axis rail 6, and an NC control device (not shown) which controls the operations of the above elements (the workpiece holding device 3, the carriage 5, and the turret tool rest 10).

The workpiece holding device 3 includes a chuck 3a which grasps a workpiece and a workpiece rotating device 3b which rotates the chuck 3a.

FIG. 1 shows, as an example, the chuck 3a which grasps the outer periphery of a workpiece with a plurality of jaws (three jaws in the drawing). Alternatively, various types of holding means such as vise type grasping means, magnetically attractive type holding means, and mechanically fastening type holding means, for example, bolting may be applied.

An expandable structure may be provided in the workpiece rotating device 3b so that the chuck 3a can freely move back and forth in the Z direction.

The Z-axis rail 4 includes two rails which are disposed in parallel to each other in a direction in which the workpiece holding device 3 and the carriage 5 which mounts thereon the turret tool rest 10 move close to or away from each other (Z direction). The Z-axis rail 4 is provided with a Z-axis movement mechanism 4a which is disposed on one end of the Z-axis rail 4 and moves the carriage 5 in the Z direction.

The Z-axis movement mechanism 4a includes, for example, a linear motion mechanism such as a ball screw mechanism. In FIG. 1, the carriage 5 is attached to a nut (not shown) of the ball screw mechanism and moved in the Z direction in such a manner that the bottom face of the carriage 5 slides on the two rails of the Z-axis rail 4.

Any mechanism that is linearly movable, for example, a piston mechanism, a rack and pinion mechanism, or a linear actuator may be applied to the Z-axis movement mechanism 4a.

The carriage 5 has the upper face which is inclined downward from the back side toward the front side of the base 2 in FIG. 1, and the X-axis rail 6 is laid on the inclined upper face.

Similarly to the Z-axis rail 4, the X-axis rail 6 includes two rails which are disposed in parallel to each other in the direction (X direction) perpendicular to the Z-axis rail 4. As shown in FIG. 2, the X-axis rail 6 is provided with an X-axis movement mechanism 6a which is disposed on one end of the X-axis rail 6 and moves the turret tool rest 10 in the X direction.

Similarly to the Z-axis movement mechanism 4a, the X-axis movement mechanism 6a includes, for example, a linear motion mechanism such as a ball screw mechanism. The turret tool rest 10 is attached to a nut (not shown) of the ball screw mechanism and moved in the X direction in such a manner that the bottom face of the turret tool rest 10 slides on the two rails of the X-axis rail 6.

Also, any mechanism that is linearly movable, for example, a piston mechanism, a rack and pinion mechanism, or a linear actuator may be applied to the X-axis movement mechanism 6a.

In FIG. 1, a direction that is perpendicular to both the X direction and the Z direction is defined as a Y direction.

Figure 2:
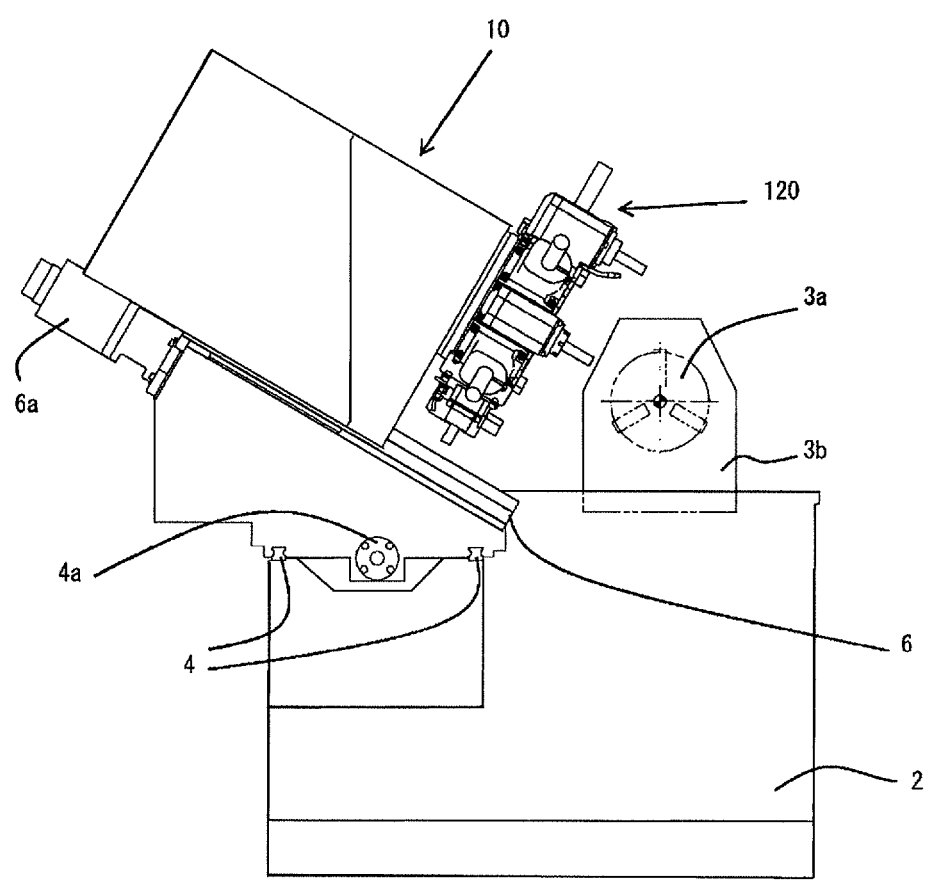
FIG. 2 is a side view of the machine tool viewed from a Z direction of FIG. 1.

As shown in FIGS. 1 and 2, the turret tool rest 10 according to the first embodiment of the present invention has a substantially rectangular parallelepiped shape. A disk-like turret 120 with a plurality of tools attached is attached to a side face on the lower side in the X direction of the turret tool rest 10 rotatably around a rotation axis of the turret 120.

With such a configuration, the tools attached to the turret 120 are arranged at positions that face the workpiece attached to the chuck 3a as shown in FIG. 2.

Next, an operation of position-controlling a tool in the Y direction in the machine tool 1 to which the turret tool rest 10 according to the first embodiment of the present invention is applied will be described with reference to FIGS. 3A and 3B.

Figure 3A:
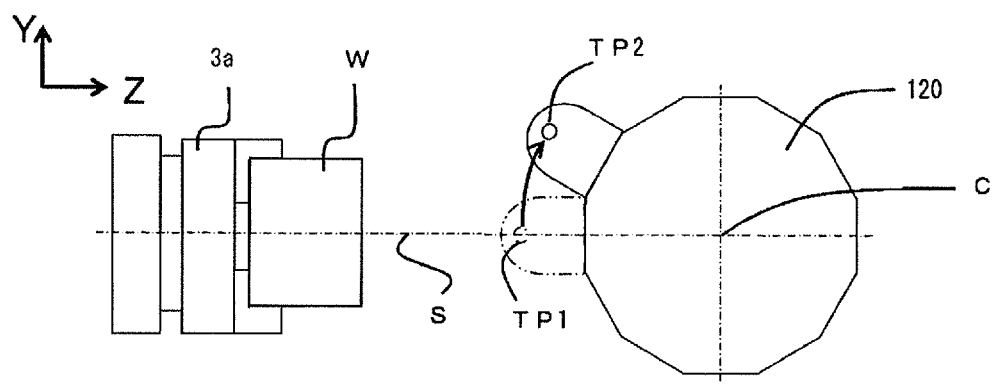
FIG. 3A is a schematic diagram showing the movement of a tool of the machine tool to which the turret tool rest according to the first embodiment is applied and showing a state of a position change in the tip of the tool caused by rotation control for a turret.
Figure 3B:
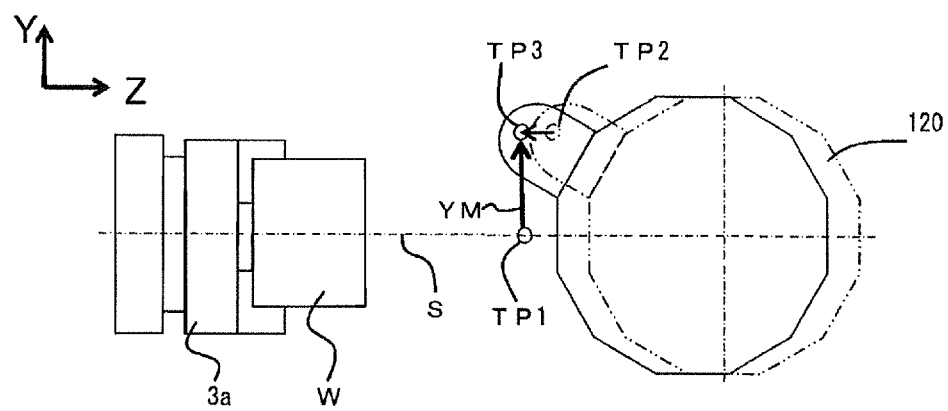
FIG. 3B is a schematic diagram showing the movement of the tool of the machine tool to which the turret tool rest according to the first embodiment is applied and showing a state of a position change in the tip of the tool caused by movement control in the Z direction for the turret.

FIGS. 3A and 3B are schematic diagrams showing the movement of a tool in the machine tool to which the turret tool rest according to the first embodiment is applied. FIG. 3A shows a state of a position change in the tip of the tool caused by rotation control for the turret. FIG. 3B shows a state of a position change in the tip of the tool caused by movement control in the Z direction for the turret.

FIGS. 3A and 3B show a state of the turret 120 and the vicinity thereof viewed from a side at which the turret 120 is located in the X direction of the machine tool 1 shown in FIG. 1. A two-dot chain line indicates a state of the turret 120 before a movement, and a solid line indicates a state of the turret 120 after the movement.

In the example shown in FIGS. 3A and 3B, the turret 120 has twelve tool attachment positions. Here, the movement of a tool attached to only one of the tool attachment positions will be described.

When, for example, a milling tool is moved from a tool position TP1 to a tool position TP3 in the Y direction in the turret tool rest according to the first embodiment, as shown in FIG. 3A, the turret 120 is first rotated in a clockwise direction in the drawing to rotationally move the milling tool from the tool position TP1 to a tool position TP2.

At this time, the tool positions TP1 and TP2 are located on the circumference of the same circle centered at a rotation center C of the turret 120. A rotation angle of the turret 120 is controlled so that the height of the tool position TP2 from a workpiece rotation axis S becomes equal to the height of the tool position TP3 which is a final target of movement from the workpiece rotation axis S.

Then, as shown in FIG. 3B, the carriage 5 shown in FIG. 1 is translated in the Z direction so as to move the milling tool close to a workpiece W with an indexing angle of the turret 120 fixed to move the milling tool from the tool position TP2 to the tool position TP3 in parallel.

A Y-direction movement YM for moving the position of the milling tool from the tool position TP1 to the tool position TP3 is controlled by continuously performing the rotational movement and the translation.

A control device (not shown) of the machine tool may directly and smoothly perform the Y-direction movement YM by combining the rotational movement and the translation.

Next, a specific configuration of the turret tool rest according to the first embodiment of the present invention and a mode of the operation thereof will be described with reference to FIGS. 4A to 9C.

Figure 4A:
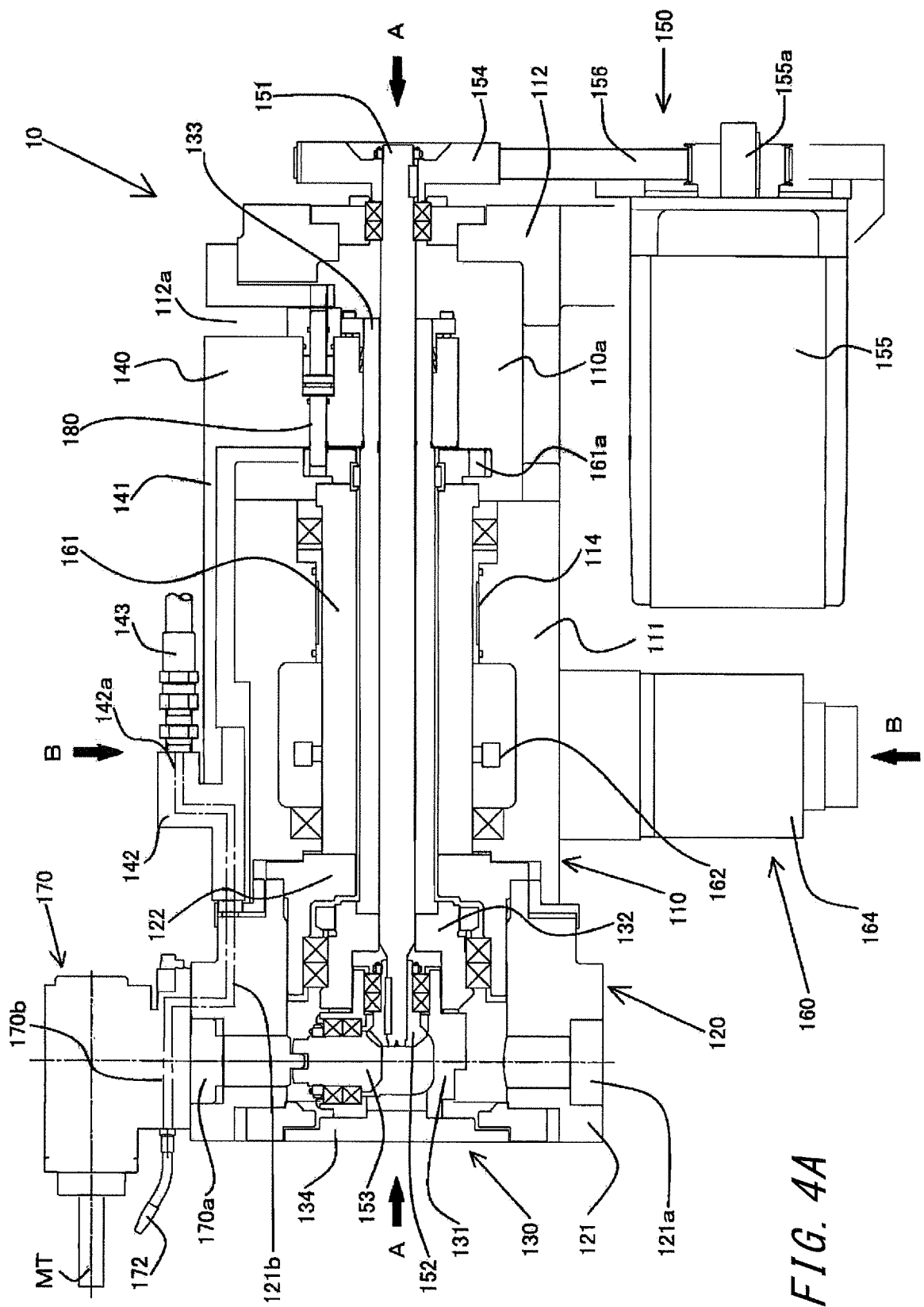
FIG. 4A is a principal part sectional view showing the turret tool rest according to the first embodiment in outline and showing a transverse section of the turret tool rest in a plane that passes through a rotation axis of the turret.
Figure 4B:
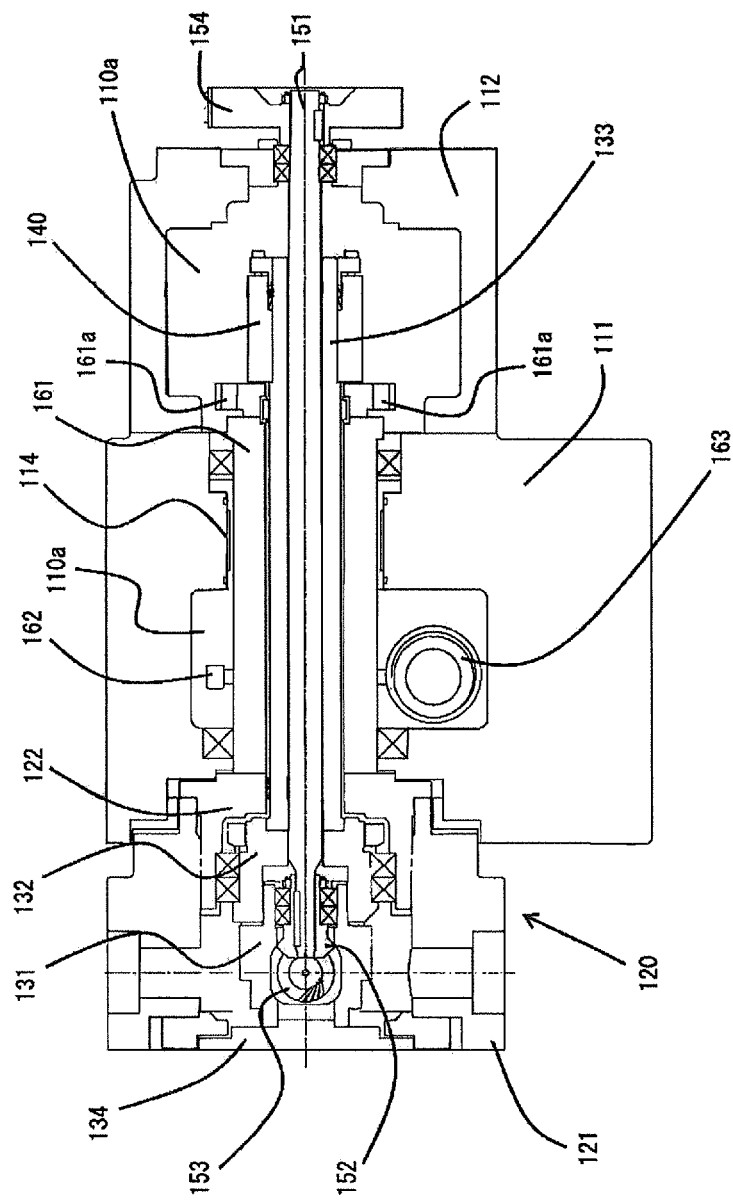
FIG. 4B is a principal part sectional view showing the turret tool rest according to the first embodiment in outline and showing a longitudinal section in an A-A plane of FIG. 4A.
Figure 4C:
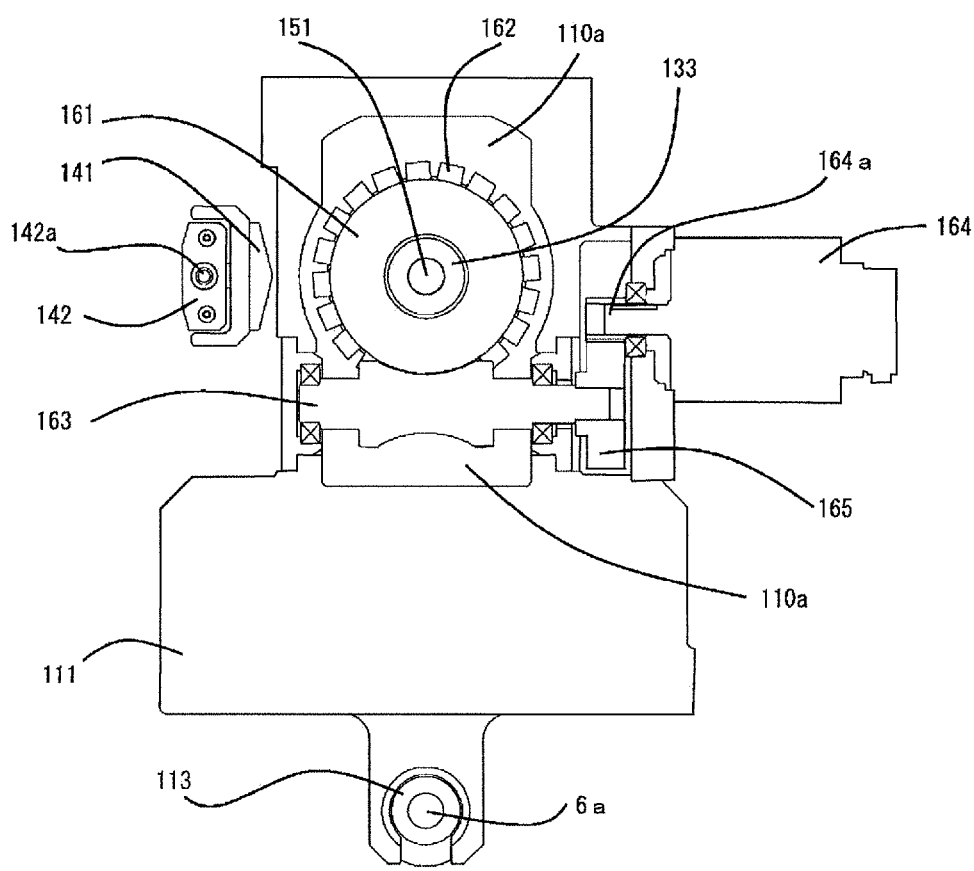
FIG. 4C is a principal part sectional view showing the turret tool rest according to the first embodiment in outline and showing a longitudinal section in a B-B plane of FIG. 4A.

FIGS. 4A to 4C are principal part sectional views showing the turret tool rest according to the first embodiment in outline. FIG. 4A shows a transverse section of the turret tool rest according to the first embodiment of the present invention in a plane that passes through the rotation axis of the turret. FIG. 4B shows a longitudinal section in an A-A plane of FIG. 4A. FIG. 4C shows a longitudinal section in a B-B plane of FIG. 4A.

Although the turret tool rest 10 is provided with a housing in FIG. 1, the housing is not shown in FIGS. 4A to 4C.

As shown in FIG. 4A, the turret tool rest 10 according to the first embodiment is provided with a turret base 110, the turret 120 which is turnably attached to the turret base 110, a mill housing 130 which is inserted into the turret 120, a joint base 140 which is fixed to one end of the mill housing 130, a tool rotating system 150 which rotates a tool attached to a mill holder 170 disposed on the turret 120, and a turret turning system 160 which turns the turret 120 with respect to the turret base 110.

The turret base 110 includes a main base 111 and a sub base 112 which is fixed to one side face of the main base 111. As shown in FIGS. 4B and 4C, a hollow part 110a which houses therein a turret turning shaft, the mill housing connection shaft (described below), or a tool main shaft is formed on the turret base 110.

The lower face of the turret base 110 is mounted so as to slide on the X-axis rail 6 disposed on the upper face of the carriage 5 shown in FIG. 2. Further, as shown in FIG. 4C, a nut 113 is fixed to the lower face of the turret base 110. The nut 113 is combined with the X-axis movement mechanism 6a to move the turret base 110 on the X-axis rail.

As shown in FIG. 4A, a long hole 112a is formed on a side part of the sub base 112 in a penetrating manner. The joint base (described below) is inserted into the long hole 112a.

A coupling hole 112b (refer to FIGS. 6A and 6B) is formed on an inner face (a face facing the joint base) of the long hole 112a of the sub base 112, and one end of a piston (engagement member, described below) is coupled to the coupling hole 112b.

A substantially cylindrical sleeve 114 is attached to the hollow part 110a of the turret base 110 in a manner to face the inner side of the hollow part 110a. The sleeve 114 has a function of clamping the whole circumference of the turret turning shaft (described below) with the turret turning shaft inserted.

The turret 120 has a bottomed circular cylindrical shape or a bottomed square cylindrical shape which includes a side part 121 and a bottom part 122.

The side part 121 has a plurality of attachment holes 121a for attaching a mill holder or a turning holder (described below) at a predetermined indexing angle position and flow paths 121b which are formed at positions corresponding to the respective attachment holes 121a inside thereof.

An opening is formed on a central part of the bottom part 122, and the tool main shaft and the mill housing connection shaft (described below) are inserted into the opening. The turret turning shaft of the turret turning system (described below) is fixed to the outer face of the bottom part 122.

The mill housing 130 includes a cylindrical side part 131, a cylindrical bottom part 132 which is fixed to one end of the cylindrical side part 131, a mill housing connection shaft 133 which is fixed to the outer side of the cylindrical bottom part 132, and a cover plate 134 which is attached to the front side (the left side in FIGS. 4A and 4B) of the cylindrical side part 131.

A cut-away part or a through hole is formed on a part of the cylindrical side part 131. The cylindrical side part 131 encloses therein a first bevel gear and a second bevel gear of the tool rotating system (described below). The second bevel gear is inserted into the cut-away part or the through hole.

The mill housing connection shaft 133 is a cylindrical shaft member, and the tool main shaft of the tool rotating system (described below) is inserted into the mill housing connection shaft 133.

One end of the mill housing connection shaft 133 is fixed to the cylindrical bottom part 132 in a manner to align a central axis of the mill housing connection shaft 133 with a central axis of the cylindrical side part 131. The joint base (described below) is fixed to the other end of the mill housing connection shaft 133.

As shown in FIGS. 4A and 4B, the joint base 140 is a substantially rectangular member. An arm 141 is integrally formed on one end of the joint base 140. A hole is formed on the other end side of the joint base 140, and the mill housing connection shaft 133 is inserted into and fixed to the hole.

A through hole 140a is formed on an intermediate part of the joint base 140, and the piston which constitutes a part of an engagement mechanism (described below) is inserted into the through hole 140a.

As shown in FIG. 4A, the end of the joint base 140, the end having the arm 141, is exposed to the outside through the long hole 112a formed on the sub base 112 of the turret base 110.

In this case, a long-axis direction of the long hole 112a formed on the sub base 112 corresponds to a direction in which the joint base 140 moves along with the turn of the mill housing connection shaft 133 fixed to the joint base 140.

Accordingly, the mill housing connection shaft 133 and the joint base 140 are turnable by an angle within a range defined by the length of the long axis of the long hole 112a.

A coolant block 142 which supplies a coolant to the mill holder or the turning holder is attached to an end of the arm 141, the end being located opposite to the joint base 140.

A flow path 142a through which the coolant flows is formed inside the coolant block 142. One end of the flow path 142a communicates with each flow path 121b which is formed on the side part 121 of the turret 120, and a pipe 143 for introducing the coolant is connected to the other end of the flow path 142a.

The tool rotating system 150 includes the tool main shaft 151, the first bevel gear 152 which is fixed to one end of the tool main shaft 151, the second bevel gear 153 which meshes with the first bevel gear 152, a pulley 154 which is fixed to the other end of the tool main shaft 151, a tool rotating motor 155, and a belt 156 which transmits torque from an output shaft 155a of the tool rotating motor 155 to the pulley 154.

As shown in FIGS. 4A and 4B, the tool main shaft 151 is inserted into the turret base 110 in a penetrating manner and rotatably attached to the sub base 112 through a bearing.

The first bevel gear 152 is fixed to one end of the tool main shaft 151. The one end of the tool main shaft 151 penetrates the cylindrical bottom part 132 of the mill housing 130 so that the first bevel gear 152 is located in the cylindrical side part 131 of the mill housing 130.

On the other hand, as described above, the other end of the tool main shaft 151 penetrates the sub base 112 of the turret base 110 so as to be exposed to the outside, and the pulley 154 is attached to the other end of the tool main shaft 151.

The first bevel gear 152 is rotatably coupled to the cylindrical side part 131 of the mill housing 130 through a bearing. The second bevel gear 153 is rotatably coupled to the cut-away part or the through hole of the cylindrical side part 131 through a bearing.

The first bevel gear 152 meshes with the second bevel gear 153. Torque of the tool main shaft 151 is output with the rotation axis thereof turned by 90° from the second bevel gear 153 by the relationship between the first bevel gear 152 and the second bevel gear 153.

The second bevel gear 153 is coupled to an input shaft of the mill holder (described below) and transmits the torque from the tool main shaft 151 to the mill holder.

As shown in FIG. 4A, the tool rotating motor 155 is disposed adjacent to the sub base 112 of the turret base 110.

The output shaft 155a of the tool rotating motor 155 is disposed in parallel to the tool main shaft 151. The belt 156 is attached between the output shaft 155a and the pulley 154 attached to the tool main shaft 151.

With such configurations, the torque of the output shaft 155a of the tool rotating motor 155 is transmitted to the tool main shaft 151 through the belt 156 and the pulley 154.

The turret turning system 160 includes a turret turning shaft 161 whose one end is fixed to the bottom part 122 of the turret 120, a plurality of cam followers 162 which are attached to the outer peripheral face of the turret turning shaft 161 at equal intervals, a globoidal cam 163 which is engaged with the cam followers 162, and a turret turning motor 164.

The turret turning shaft 161 is rotatably attached to the hollow part 110a of the main base 111 of the turret base 110 through a bearing. The turret 120 integrally rotates by torque of the turret turning shaft 161.

A coupling hole 161a is formed on the other end of the turret turning shaft 161, and one end of the piston (engagement member, described below) is coupled to the coupling hole 161a.

As described above, the substantially cylindrical sleeve 114 is attached to the hollow part 110a of the turret base 110 in a manner to face the inner side of the hollow part 110a. The sleeve 114 clamps the whole circumference of the turret turning shaft 161 with the turret turning shaft 161 inserted.

As shown in FIG. 4C, the cam followers 162 are radially disposed on the outer peripheral face of the turret turning shaft 161 at equal intervals. On the other hand, the globoidal cam 163 is rotatably attached to the hollow part 110a of the main base 111 of the turret base 110 through a bearing.

A groove (not shown) for engaging the cam followers 162 is formed on the surface of the globoidal cam 163. A rotation axis of the globoidal cam 163 is disposed perpendicularly to a rotation axis of the turret turning shaft 161. A spur gear 165 is attached to one end of the globoidal cam 163.

As shown in FIGS. 4A and 4C, the turret turning motor 164, for example, a servo motor is disposed on the main base 111 of the turret base 110 in such a manner that an output shaft 164a of the turret turning motor 164 penetrates the main base 111 through a bearing.

The output shaft 164a of the turret turning motor 164 is disposed parallel to the rotation axis of the globoidal cam 163. A gear which meshes with the spur gear 165 is formed on the peripheral face of the output shaft 164a.

Torque of the output shaft 164a of the turret turning motor 164 rotates the globoidal cam 163 in a predetermined direction through the spur gear 165 which is attached to one end of the globoidal cam 163.

As shown in FIG. 4C, when the cam followers 162 are engaged with the groove on the surface of the globoidal cam 163, a feed in the rotation direction (circumferential direction) of the turret turning shaft 161 is applied to the cam followers 162, which rotates the turret turning shaft 161 in a predetermined direction.

At this time, when the globoidal cam 163 rotates in one direction, the turret turning shaft 161 rotates in one direction through the cam followers 162. When the globoidal cam 163 rotates in the opposite direction, a feed in the opposite direction is applied to the cam followers 162, which rotates the turret turning shaft 161 in the opposite direction.

When a servo motor is used as the turret turning motor 164 as described above, a rotation amount of the turret turning motor 164 can be accurately obtained from a command value from the NC control device (not shown).

On the other hand, in a mechanism that includes the cam followers 162 and the globoidal cam 163, the cam followers 162 are constantly engaged with the groove of the globoidal cam 163. Thus, so-called "backlash" does not occur.

Thus, the above configuration enables the positions of the cam followers 162 (that is, the rotation angle of the turret turning shaft 161) to be correctly obtained by NC control with respect to the turret turning motor 164.

That is, applying a servo motor to the turret turning motor 164 which generates torque of the globoidal cam 163 which moves the cam followers 162 formed on the turret turning shaft 161 enables the servo motor to have a function as a rotation angle sensor (angle detector) for the turret turning shaft 161.

Any configuration that can obtain the rotation amount of the turret turning motor 164, for example, a configuration that includes an encoder attached to a common motor to count the rotation amount may be used.

As shown in FIG. 4A, the plurality of attachment holes 121a are formed on the side part 121 of the turret 120. The mill holders 170 or turning holders 171 (refer to FIG. 5) for attaching various tools for performing milling or turning are attached to the attachment holes 121a.

FIG. 4A shows a case in which the mill holder 170 which holds a milling tool MT is attached to the attachment hole 121a.

The mill holder 170 includes an input shaft 170a which is rotatably disposed on a face facing the attachment hole 121a. The input shaft 170a is coupled to the second bevel gear 153 of the tool rotating system 150 to transmit torque from the second bevel gear 153.

The mill holder 170 includes a rotation mechanism (not shown) which is disposed inside the mill holder 170 and transmits torque input from the input shaft 170a while changing the direction of the torque to rotate the milling tool MT attached to an output shaft of the rotation mechanism by the transmitted torque.

For example, an example of the rotation mechanism includes a gear mechanism that includes two bevel gears similar to the first bevel gear 152 and the second bevel gear 153 of the tool rotating system 150.

A flow path 170b which allows fluid to flow therethrough is formed inside the mill holder 170. A nozzle 172 which jets the fluid is attached to an end of the flow path 170b, the end facing the milling tool MT.

As shown in FIG. 4A, the flow path 121b formed on the turret 120, the flow path 142a formed on the coolant block 142, and the flow path 170b formed on the mill holder 170 communicate with each other, so that a coolant flowing from the pipe 143 reaches the nozzle 172 through the above flow paths and is jetted toward the milling tool MT.

As shown in FIGS. 4A to 4C, in the turret tool rest 10 according to the first embodiment of the present invention, the first bevel gear 152 and the second bevel gear 153 are attached to the inside of the cylindrical side part 131 of the mill housing 130 so as to be enclosed therein with the tool main shaft 151 inserted in the mill housing connection shaft 133.

Then, the mill housing connection shaft 133 is inserted into the turret turning shaft 161 in such a manner that the cylindrical side part 131 and the cylindrical bottom part 132 of the mill housing 130 are disposed inside the turret 120 with the turret turning shaft 161 attached.

Then, the turret turning shaft 161 is attached to the inside of the hollow part 110a of the turret base 110 with the cam followers 162 engaged with the globoidal cam 163.

At last, the joint base 140 is attached to the end of the mill housing connection shaft 133, and the pulley 154 and the belt 156 are then attached to the tool main shaft 151 to assemble the turret tool rest 10.

Figure 5:
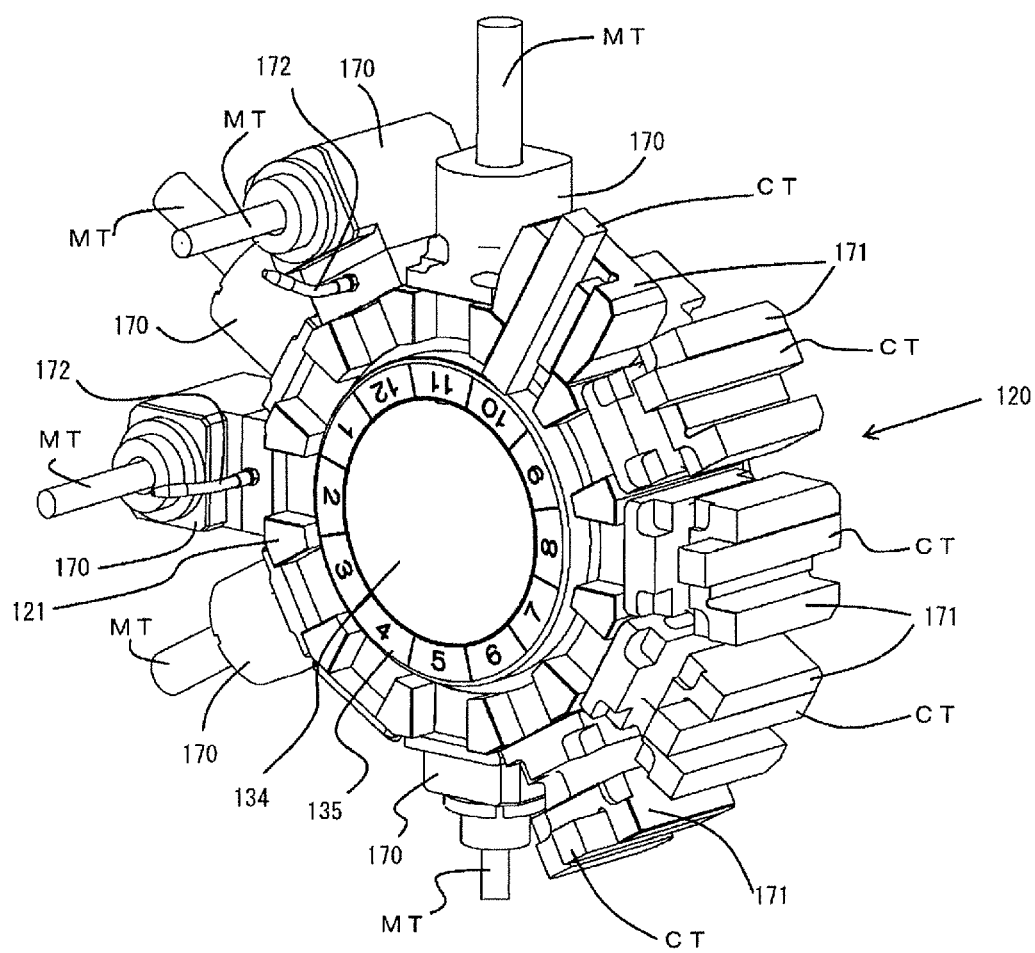
FIG. 5 is a perspective view showing an even 12-station turret which is applied to the turret tool rest according to the first embodiment in outline.

FIG. 5 is a perspective view showing the turret 120 which is applied to the turret tool rest 10 according to the first embodiment in outline.

As shown in FIGS. 4A to 4C, the turret 120 includes the side part 121 and the bottom part 122 (located on the back side in FIG. 5 and thus not shown in FIG. 5). As described above, the plurality of attachment holes (not shown) for attaching the mill holder 170 or the turning holder 171 are formed on the side part 121.

FIG. 5 shows a case in which the side part 121 has twelve attachment holes. In this specification, a turret of a type shown in FIG. 5 is referred to as an "even 12-station turret".

As shown in FIG. 5, the mill holder 170 includes a type in which a milling tool MT is radially attached to the turret 120 in the radial direction of the turret 120 and a type in which a milling tool MT is attached to the turret 120 in a direction perpendicular to the radial direction.

As described above, the mill holder 170 is provided with the input shaft 170a which inputs torque from the tool main shaft 151, the rotation mechanism (not shown) which transmits the input torque to the milling tool MT, and the nozzle 172 which jets a coolant to the vicinity of a processing point of the milling tool MT.

When the input shaft 170a is coupled to the second bevel gear 153 of the tool rotating system 150, the milling tool MT rotates. Then, the rotating milling tool MT is brought into contact with the workpiece W to perform milling on the workpiece W.

The turning holder 171 includes fixing means for attaching a turning tool CT, and, similarly to the mill holder 170, includes a flow path formed inside the turning holder 171 and a jet port 173 (refer to FIG. 7C) which jets a coolant flowing through the flow path.

The turning tool CT is not a rotary tool. Thus, when the turning tool CT is attached to the turning holder 171, various fixing means such as holding means, for example, a vise or a clamp jig and mechanical fixing means, for example, bolting may be employed.

As shown in FIG. 5, the turning holder 171 includes a type in which a turning tool CT is radially attached to the turret 120 in the radial direction of the turret 120 and a type in which a turning tool CT is attached to the turret 120 in the direction perpendicular to the radial direction. All the turning holders 171 hold the turning tools CT in a direction facing the workpiece W.

Then, the workpiece W is attached to the chuck 3a shown in FIGS. 1 and 2, and the turning tool CT is brought into contact with the workpiece W while rotating the workpiece W by the workpiece rotating device 3b to perform turning on the workpiece W.

As described above, the mill housing 130 is housed inside the side part 121 of the turret 120. In FIG. 5, the cover plate 134 is attached to the front face on the front side in the drawing of the mill housing 130.

The cover plate 134 has a function of preventing an object from entering the mill housing 130. A tool number display plate 135 which has numbers 1 to 12 applied to the positions of the respective tools is attached to the outer side of the cover plate 134.

In the tool number display plate 135, an illuminator may be disposed on the rear face of the part having the numbers to display a number of a tool that is currently subjected to processing or coupled to the tool main shaft 151 by lighting in real time.

Next, an example of the engagement mechanism which switches between coupling between the joint base 140 and the turret base 110, and coupling between the joint base 140 and the turret turning shaft 161, the engagement mechanism being the characteristic of the turret tool rest of the first embodiment of the present invention, will be described with reference to FIGS. 6A and 6B.

Figure 6A:
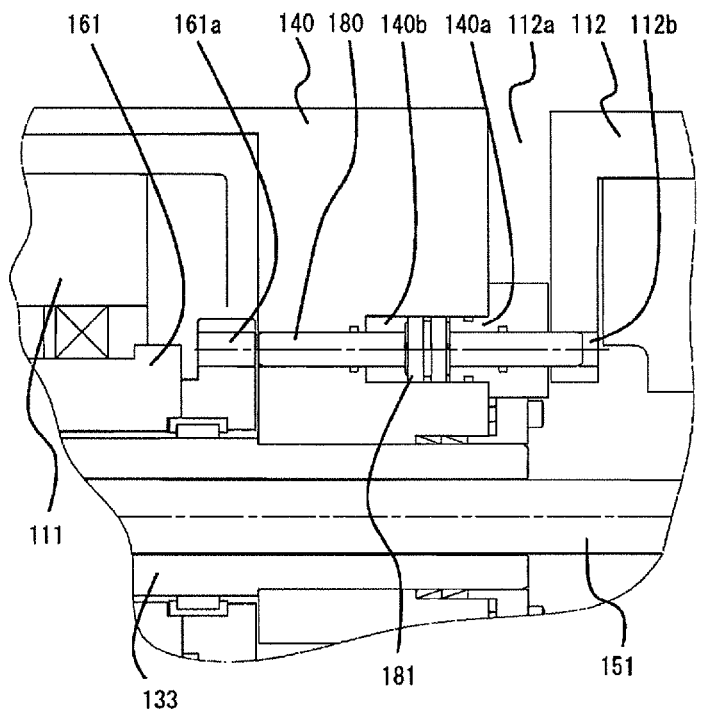
FIG. 6A is an enlarged view showing an engagement mechanism which includes a piston disposed on a joint base and the vicinity thereof in outline and showing a case in which the joint base and a turret base are connected to each other.
Figure 6B:
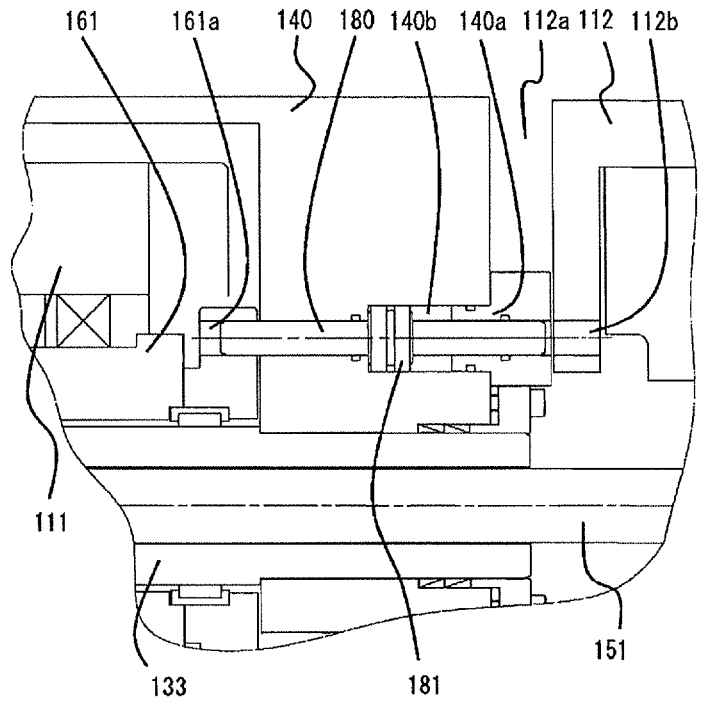
FIG. 6B is an enlarged view showing the engagement mechanism which includes the piston disposed on the joint base and the vicinity thereof in outline and showing a case in which the joint base and a turret turning shaft are connected to each other.

FIGS. 6A and 6B are enlarged views showing the engagement mechanism which includes a piston 180 disposed on the joint base 140 shown in FIG. 4A and the vicinity thereof in outline. FIG. 6A shows a case in which the joint base 140 and the turret base 110 are connected to each other. FIG. 6B shows a case in which the joint base 140 and the turret turning shaft 161 are connected to each other.

In the turret tool rest 10 according to the first embodiment of the present invention, a pressure chamber 140b is formed on the through hole 140a which is formed on the intermediate part of the joint base 140. The piston (engagement member) 180 is inserted into the through hole 140a and the pressure chamber 140b.

The piston 180 has a large diameter part 181 which is formed in an intermediate region of the piston 180 and has substantially the same cross-sectional shape as the pressure chamber 140b. The large diameter part 181 is disposed inside the pressure chamber 140b to divide the pressure chamber 140b into right and left sides in the drawings.

The pressure chamber 140b has flow paths (not shown) which are formed on the respective right and left divided chambers and capable of supplying or collecting fluid (for example, oil).

The piston 180 has a length that is longer than the width in the drawings of the joint base 140. The piston 180 can displace between a first position located at a side corresponding to the sub base 112 of the turret base 110 and a second position located at a side corresponding to the turret turning shaft 161.

The through hole 140a and the pressure chamber 140b of the joint base 140, the piston 180, the coupling hole 112b formed on the sub base 112, and the coupling hole 161a formed on the turret turning shaft 161 constitute the engagement mechanism.

In a switching operation performed by the engagement mechanism, fluid is first supplied to a region in the pressure chamber 140b, the region being located on the left side in the drawings with respect to the large diameter part 181 of the piston 180, to move the piston 180 to the first position on the right side in the drawings.

At this time, an end of the piston 180 enters the coupling hole 112b formed on the sub base 112 of the turret base 110, so that the sub base 112 and the piston 180, that is, the turret base 110 and the joint base 140 are coupled and fixed to each other.

On the other hand, coupling between an end of the piston 180, the end facing the turret turning shaft 161, and the coupling hole 161a formed on the turret turning shaft 161 is released. Thus, the turret turning shaft 161 becomes unfixed to the joint base 140.

As a result, the turret turning shaft 161 becomes rotatable relative to all the joint base 140, the mill housing connection shaft 133 which is fixed to the joint base 140, and the turret base 110 which is coupled to the joint base 140.

In this state, the globoidal cam 163 shown in FIG. 4C is rotated to rotate the turret turning shaft 161 in a predetermined direction. Accordingly, the turret 120 rotates relative to the joint base 140 and the mill housing connection shaft 133 which are fixed to the turret base 110 in the above predetermined direction with respect to the mill housing 130.

Thus, an operation of switching and connecting, in any manner, the position of the attachment hole 121a which is formed on the turret 120 and the position of the second bevel gear 153 which projects from the cylindrical side part 131 of the mill housing 130 can be performed by switching the piston 180 of the engagement mechanism to the first position.

On the other hand, as shown in FIG. 6B, when fluid is supplied to a region in the pressure chamber 140b, the region being located on the right side in the drawings with respect to the large diameter part 181 of the piston 180, to move the piston 180 to the second position on the left side in the drawings, the end of the piston 180 enters the coupling hole 161a forming on the turret turning shaft 161.

Accordingly, the turret turning shaft 161 and the joint base 140 are coupled and fixed to each other.

On the other hand, the coupling between the end of the piston 180, the end facing the sub base 112 of the turret base 110, and the coupling hole 112b formed on the sub base 112 is released. Thus, the turret base 110 becomes unfixed to the joint base 140.

As a result, the joint base 140 is coupled and fixed to the turret turning shaft 161. Thus, the joint base 140 and the turret turning shaft 161 become rotatable relative to the turret base 110.

As described above, the tool main shaft 151 is inserted into the mill housing connection shaft 133 which is fixed to the joint base 140. The first bevel gear 152 which is attached to one end of the tool main shaft 151 is attached to the cylindrical side part 131 of the mill housing 130 through the bearing.

Thus, the mill housing connection shaft 133 which is fixed to the joint base 140, and the tool main shaft 151 are relatively rotatable.

In this state, when the globoidal cam 163 is rotated to rotate the turret turning shaft 161 in a predetermined direction. Accordingly, the joint base 140 and the mill housing connection shaft 133 which are coupled to the turret turning shaft 161 rotate relative to the turret base 110 in the predetermined direction.

Thus, the turret 120, the mill housing 130, and the joint base 140 can be coupled to each other and rotated relative to the turret base 110 by switching the piston 180 of the engagement mechanism to the second position. Thus, it is possible to perform the Y-direction position control for the tool as shown in FIGS. 3A and 3B while rotating, for example, the milling tool MT of the mill holder 170 shown in FIG. 4A.

Next, a specific operation of processing the workpiece W using the turret tool rest 10 according to the first embodiment of the present invention will be described in outline with reference to FIGS. 7A to 9C.

Figure 7A:
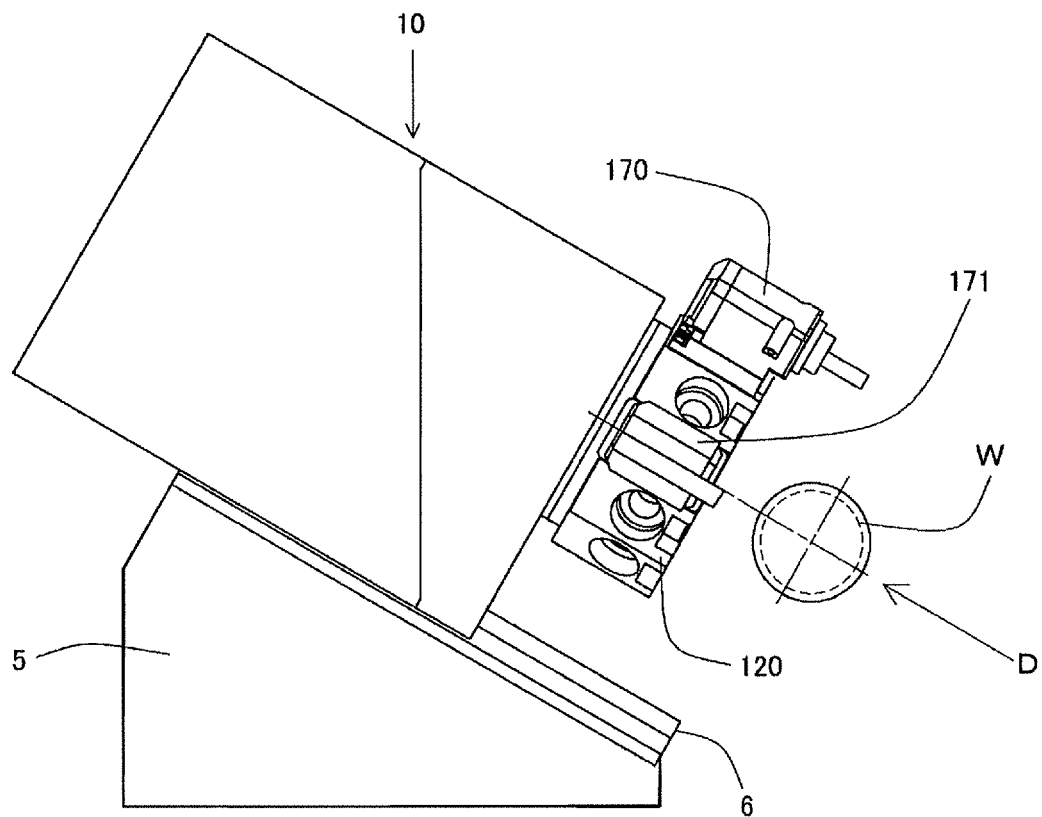
FIG. 7A is a schematic diagram showing a case in which turning is performed using a turning tool on the turret tool rest according to the first embodiment and showing the turret tool rest viewed from the Z direction.
Figure 7B:
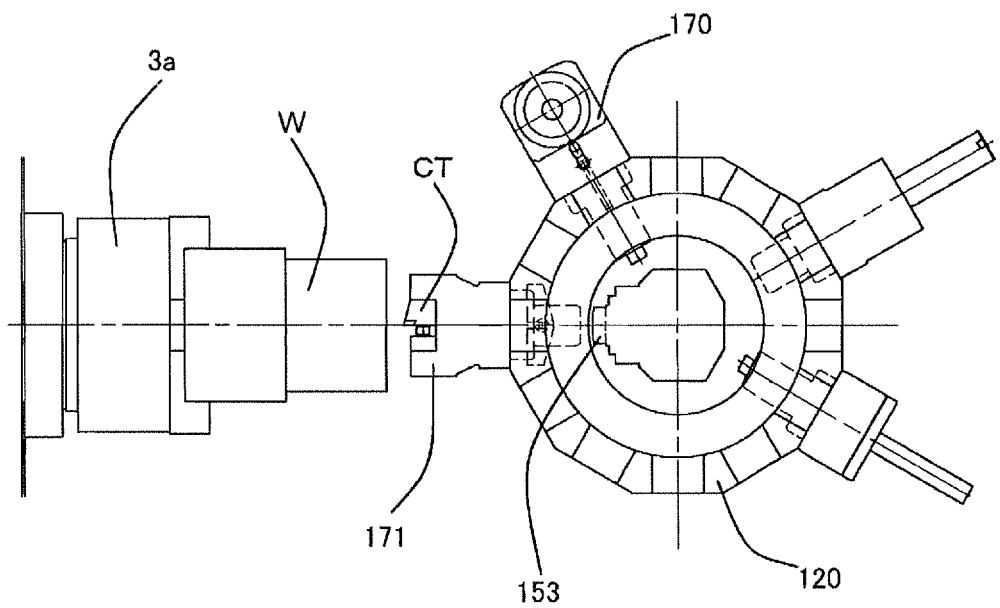
FIG. 7B is a schematic diagram showing a case in which turning is performed using the turning tool on the turret tool rest according to the first embodiment and showing the turret tool rest viewed from a direction indicated by an arrow D of FIG. 7A.
Figure 7C:
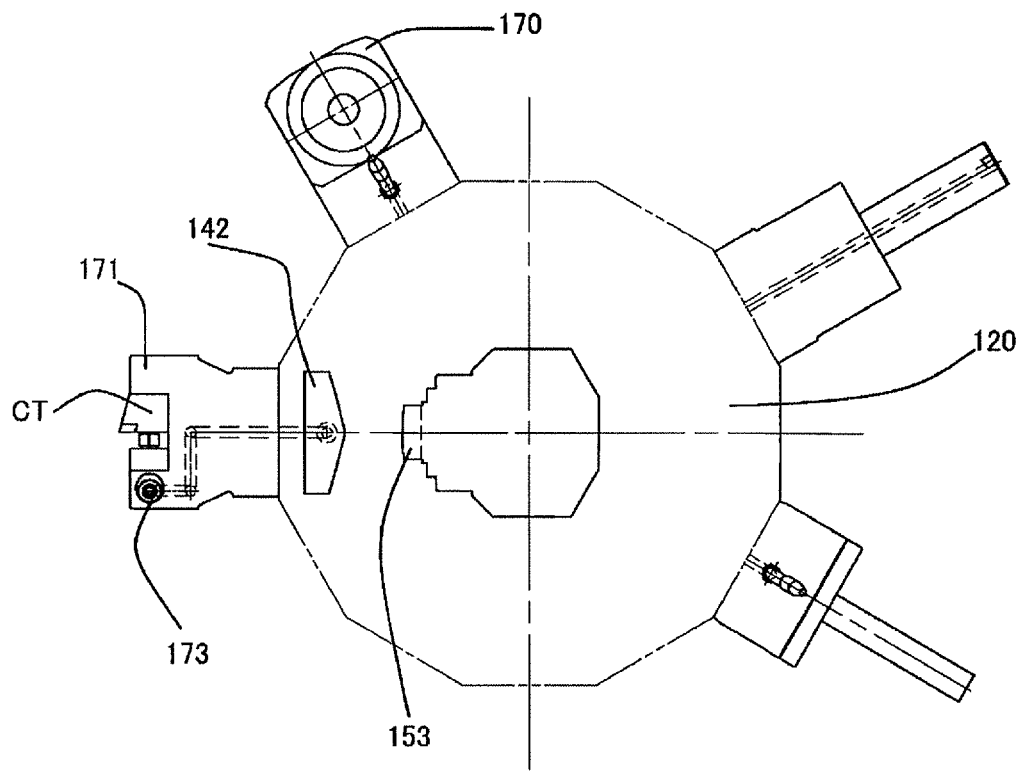
FIG. 7C is a schematic diagram showing a case in which turning is performed using the turning tool on the turret tool rest according to the first embodiment and showing the inside of the turret in FIG. 7B in outline.

FIGS. 7A to 7C are schematic diagrams showing a case in which turning is performed using the turning tool CT on the turret tool rest 10 according to the first embodiment. FIG. 7A is a diagram showing the turret tool rest 10 viewed from the Z direction. FIG. 7B is a diagram showing the turret tool rest 10 viewed from a direction indicated by an arrow D of FIG. 7A. FIG. 7C shows the inside of the turret 120 in FIG. 7B in outline.

Figure 8A:
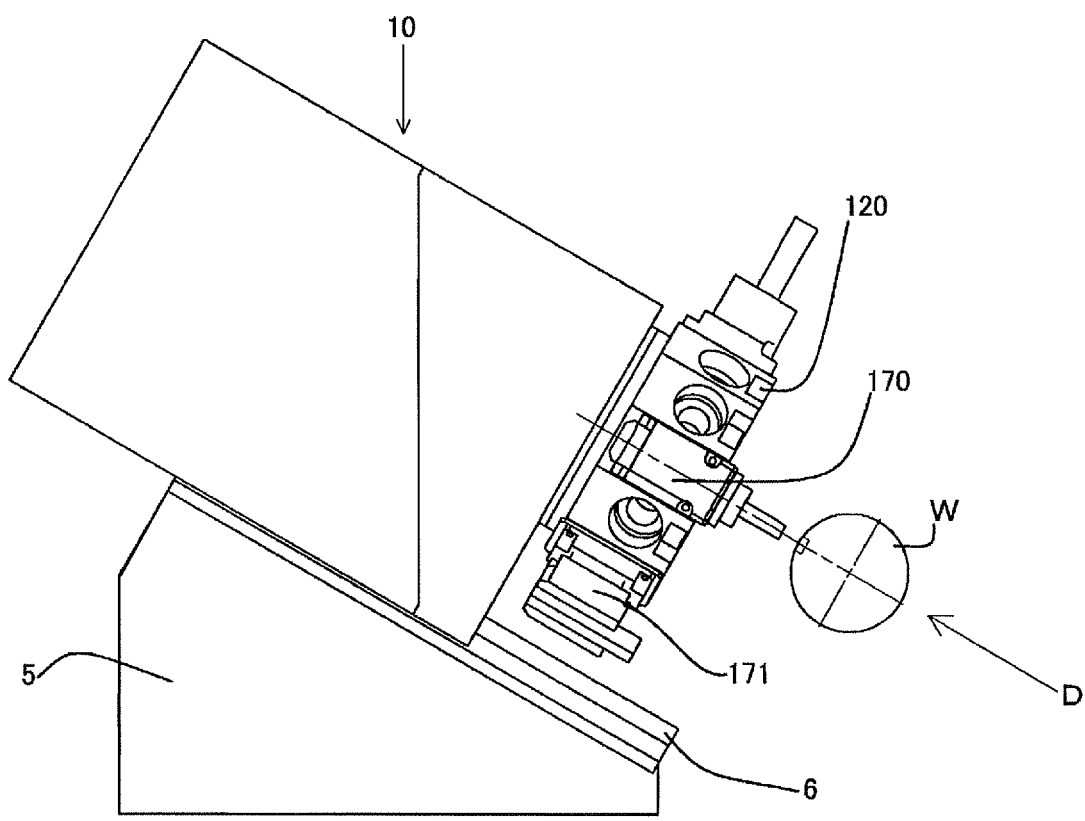
FIG. 8A is a schematic diagram showing a case in which milling in the Z direction is performed using a milling tool on the turret tool rest according to the first embodiment and showing the turret tool rest viewed from the Z direction.
Figure 8B:
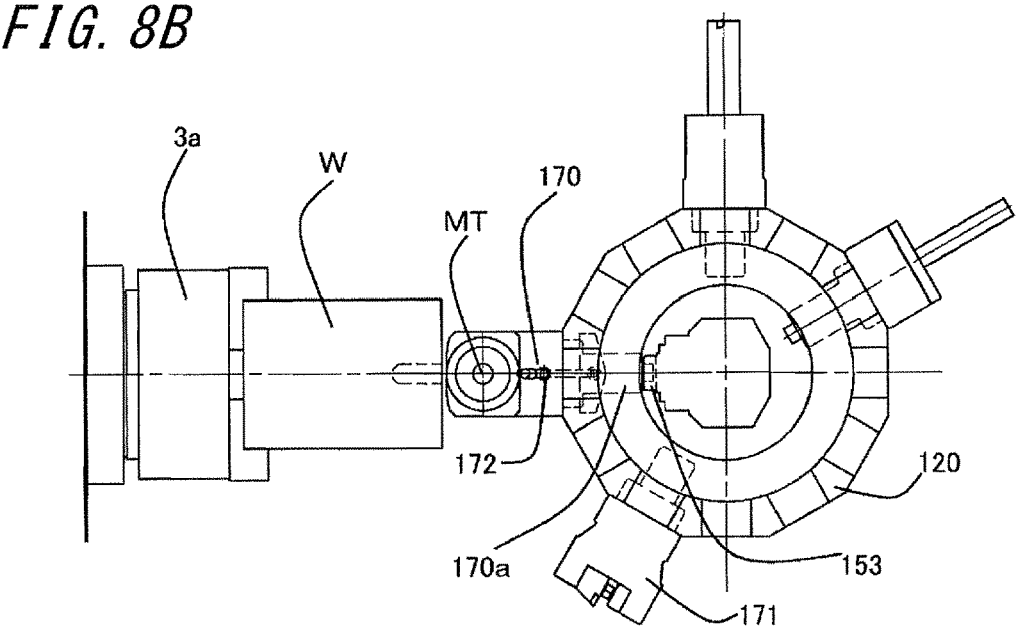
FIG. 8B is a schematic diagram showing a case in which milling in the Z direction is performed using the milling tool on the turret tool rest according to the first embodiment and showing the turret tool rest viewed from a direction indicated by an arrow D of FIG. 8A.
Figure 8C:
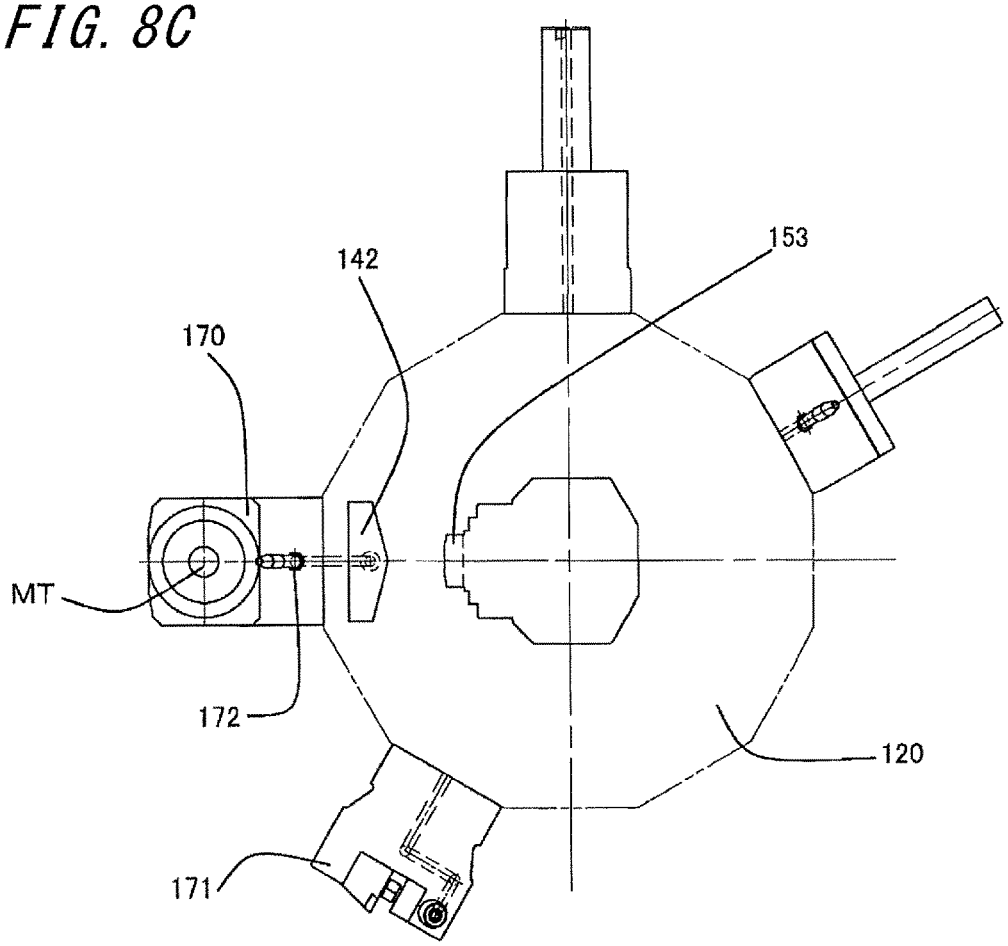
FIG. 8C is a schematic diagram showing a case in which milling in the Z direction is performed using the milling tool on the turret tool rest according to the first embodiment and showing the inside of the turret in FIG. 8B in outline.

FIGS. 8A to 8C are schematic diagrams showing a case in which milling in the Z direction is performed using the milling tool MT on the turret tool rest 10 according to the first embodiment. FIG. 8A is a diagram showing the turret tool rest 10 viewed from the Z direction. FIG. 8B is a diagram showing the turret tool rest 10 viewed from a direction indicated by an arrow D of FIG. 8A. FIG. 8C shows the inside of the turret 120 in FIG. 8B in outline.

Figure 9A:
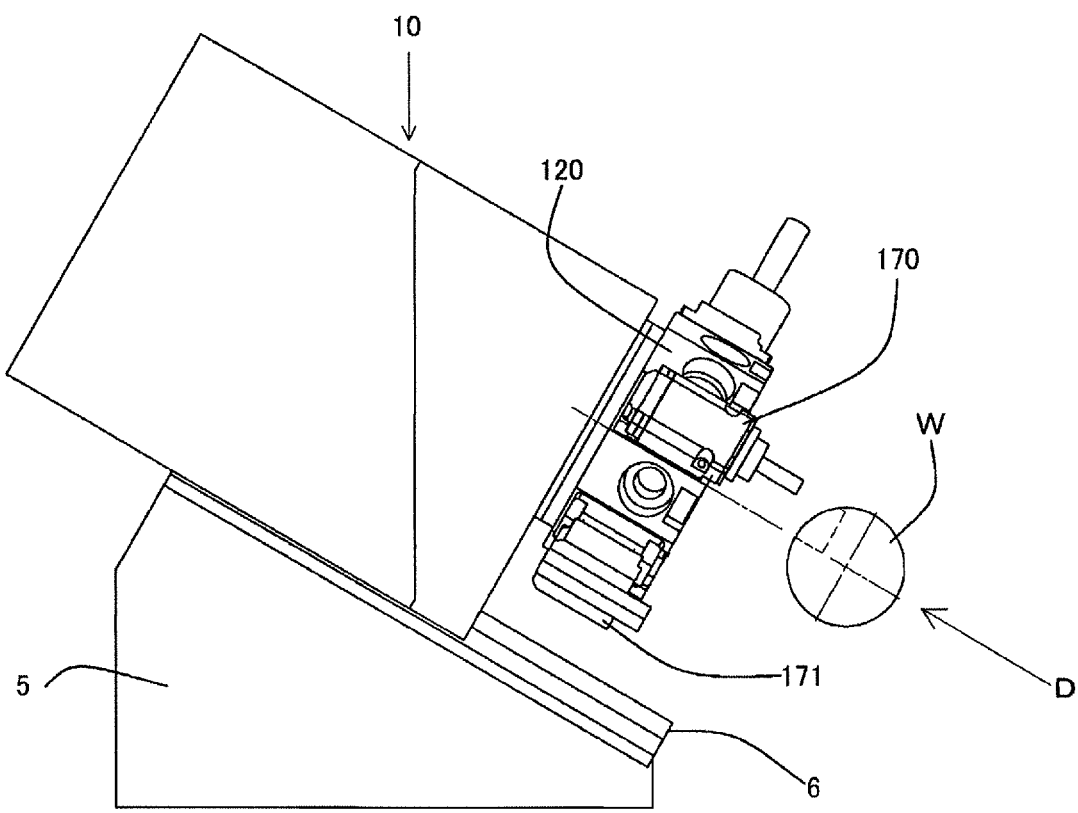
FIG. 9A is a schematic diagram showing a case in which milling including Y-direction control is performed using a milling tool on the turret tool rest according to the first embodiment and showing the turret tool rest viewed from the Z direction.
Figure 9B:
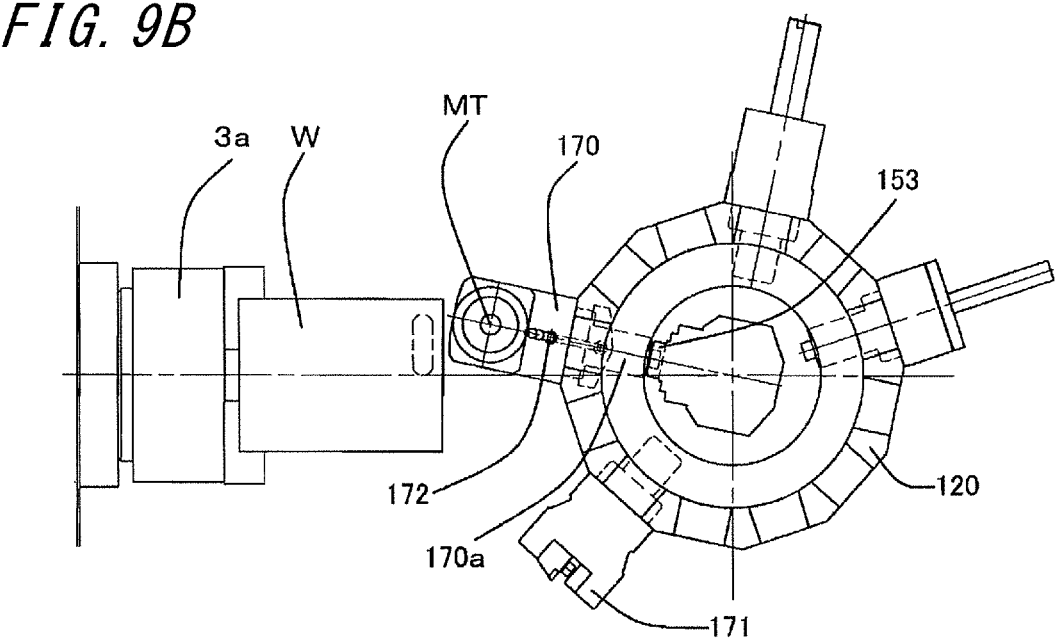
FIG. 9B is a schematic diagram showing a case in which milling including Y-direction control is performed using the milling tool on the turret tool rest according to the first embodiment and showing the turret tool rest viewed from a direction indicated by an arrow D of FIG. 9A.

FIGS. 9A to 9C are schematic diagrams showing a case in which milling including Y-direction control is performed using the milling tool MT on the turret tool rest 10 according to the first embodiment. FIG. 9A is a diagram showing the turret tool rest 10 viewed from the Z direction. FIG. 9B is a diagram showing the turret tool rest 10 viewed from a direction indicated by an arrow D of FIG. 9A. FIG. 9C shows the inside of the turret 120 in FIG. 9B in outline.

FIGS. 7A to 9C show a structure viewed by partially transmitting the inside of the turret 120. In FIGS. 7A to 9C, a position of the turret 120 that faces the workpiece W in the Z direction is defined as an "original position".

In the turning shown in FIGS. 7A to 7C, the turning tool CT attached to the turning holder 171 of the turret 120 is selected and processing on the workpiece W is performed.

An operation of selecting the turning tool CT in the turret 120 first moves the piston 180 of the joint base 140 to the first position with the clamp to the turret turning shaft 161 by the sleeve 114 shown in FIGS. 4A to 4C and 6A and 6B released.

At this time, as described above, the turret turning shaft 161 can rotate relative to the turret base 110, the mill housing 130, and the joint base 140. Thus, the turret turning shaft 161 is then rotated to move the turning holder 171 with the turning tool CT attached to the original position.

After the turning holder 171 is located at the original position, the sleeve 114 operates to clamp the whole circumference of the turret turning shaft 161 to thereby prevent turn of the turret 120.

At this time, the coolant block 142 attached to the joint base 140 and the second bevel gear 153 of the tool rotating system 150 are located at the original position of the turret 120, and a coolant is supplied to the turning holder 171 from the coolant block 142 and jetted from the jet port 173.

Position adjustment in the X direction for the turning tool CT is performed by moving the turret tool rest 10 on the X-axis rail 6 shown in FIG. 7A. Position adjustment in the Z direction for the turning tool CT is performed by moving the carriage 5 on the Z-axis rail 4 shown in, for example, FIG. 2.

After these position adjustments for the turning tool CT, the workpiece W held by the workpiece holding device 3 is rotated to allow the turning tool CT to cut into the workpiece W by a predetermined depth to execute the turning.

In the milling shown in FIGS. 8A to 8C, the milling tool MT attached to the mill holder 170 of the turret 120 is selected and processing on the workpiece W is performed.

An operation of selecting the milling tool MT in the turret 120 first moves the piston 180 of the joint base 140 to the first position with the clamp to the turret turning shaft 161 by the sleeve 114 released, similarly to the operation of selecting the turning tool CT shown in FIGS. 7A to 7C.

Then, the turret turning shaft 161 is rotated to move the mill holder 170 with the milling tool MT attached to the original position.

After the mill holder 170 is located at the original position, the sleeve 114 operates to clamp the whole circumference of the turret turning shaft 161 to thereby prevent turn of the turret 120 and to couple the second bevel gear 153 of the tool rotating system 150 and the input shaft 170a of the mill holder 170 which are located at the original position to each other as shown in FIG. 8B.

Accordingly, torque from the tool main shaft 151 is transmitted to the milling tool MT attached to the mill holder 170 to rotate the milling tool MT. As shown in FIG. 8C, a coolant is supplied to the mill holder 170 from the coolant block 142 located at the original position and jetted from the nozzle 172.

Position adjustments in the X direction and the Z direction for the milling tool MT are performed by moving the turret tool rest 10 on the X-axis rail 6 and moving the carriage 5 on the Z-axis rail 4, similarly to the turning shown in FIGS. 7A to 7C.

After these position adjustments for the milling tool MT, the milling tool MT is rotated so as to cut into the workpiece W held by the workpiece holding device 3 by a predetermined depth and move in the Z direction to execute the milling in the Z direction.

Milling can be performed in combination with position control in the Y direction as shown in FIGS. 3A and 3B by using the turret tool rest 10 according to the first embodiment of the present invention.

The Y-direction position control can also be applied to movement to a processing starting point other than the original position in the milling to the Z direction shown in FIGS. 8A to 8C or three-dimensional processing in combination with movement on the X-axis rail 6 and the Z-axis rail 4.

An operation of performing position control to the Y direction while maintaining the rotation of the milling tool MT first moves the piston 180 of the joint base 140 to the first position with the clamp to the turret turning shaft 161 by the sleeve 114 released.

Then, the turret turning shaft 161 is rotated to move the mill holder 170 with the milling tool MT attached to the original position.

After the mill holder 170 is located at the original position, the sleeve 114 operates to clamp the whole circumference of the turret turning shaft 161 to thereby prevent turn of the turret 120 and to couple the second bevel gear 153 of the tool rotating system 150 and the input shaft 170a of the mill holder 170 which are located at the original position to each other.

Accordingly, torque from the tool main shaft 151 is transmitted to the milling tool MT attached to the mill holder 170 to rotate the milling tool MT.

Then, the piston 180 of the joint base 140 is moved to the second position to couple the joint base 140 and the turret turning shaft 161 to each other as shown in FIG. 6B.

Then, the operation of the sleeve 114 is stopped to release the clamp to the turret turning shaft 161.

Accordingly, the turret 120 fixed to the turret turning shaft 161 and the mill housing connection shaft 133 fixed to the joint base 140 become integrally rotatable while maintaining the positional relationship therebetween (that is, maintaining a state in which the second bevel gear 153 and the input shaft 170a of the mill holder 170 are coupled to each other) as shown in FIG. 9B.

The positional relationship between the coolant block 142 attached to the joint base 140 and the turret 120 is also maintained. Thus, the coolant block 142 can rotate together with the turret 120 while supplying a coolant to the mill holder 170 as shown in FIG. 9C.

The Y-direction position control is performed by combining the rotation and the movement in the Z direction of the turret 120 as shown in FIGS. 3A and 3B to move the milling tool MT to any processing starting point, and the milling tool MT is moved on the Z-axis rail 4 in the Z direction from the processing starting point to perform milling in the Z direction.

The rotation, and the movement on the X-axis rail 6 and the movement on the Z-axis rail 4 of the turret 120 may be simultaneously controlled in accordance with a command of, for example, the NC control device (not shown) to perform three-dimensional processing on the workpiece W using the rotating milling tool MT.

As described above, the turret tool rest 10 according to the first embodiment of the present invention shown in FIGS. 1 to 9C makes it possible to switch between the coupling between the joint base 140 and the turret base 110, and the coupling between the joint base 140 and the turret turning shaft 161 by moving the piston 180 of the engagement mechanism disposed on the joint base 140 between the first position corresponding to the turret base 110 and the second position corresponding to the turret turning shaft 161. Thus, the engagement member can be downsized compared to a conventional annular piston.

Further, the pressure chamber 140b which drives the piston 180 can also be downsized corresponding to the cross-sectional area of the piston 180. As a result, an increase in the weight of the entire turret tool rest 10 can be reduced.

The machine tool provided with the turret tool rest 10 according to the first embodiment makes it possible to select the coupling between the joint base 140 and the turret base 110 or the coupling between the joint base 140 and the turret turning shaft 161 by the engagement mechanism of the joint base 140.

Thus, it is possible to select the operation of rotating the turret 120 with torque of the tool main shaft 151 transmitted to the milling tool MT attached to the turret 120, or the operation of rotating the turret 120 with the transmission of the torque to the milling tool MT released.

Thus, the NC control device of the machine tool can selectively perform the operation of selecting one of a plurality of tools by rotating the turret 120, or the operation of position-controlling a milling tool MT attached to the turret 120 in the Y direction while rotating the milling tool MT.

As described above, the turret 120 can be rotated relative to the mill housing 130 by switching between the coupling and the release between the turret 120 and the mill housing 130.

Thus, the coupling can be performed in any of the attachment holes 121a of the turret 120 regardless of the position of an attachment hole 121a to which the mill holder 170 provided with the milling tool MT is attached.

The cam followers 162 are disposed on the turret tuning shaft 161 at equal intervals, and the cam followers 162 are engaged with the globoidal cam 163 to rotate the turret turning shaft 161. Thus, so-called backlash does not occur between the cam followers 162 and the groove of the globoidal cam 163.

Accordingly, the rotation position or the rotation angle of the globoidal cam 163 always corresponds to the rotation position or the rotation angle of the turret turning shaft 161. Thus, precise positioning of the turret turning shaft 161 can be performed by detecting the rotation position or the rotation angle of the globoidal cam 163.

In this case, the number of cam followers 162 disposed on the turret turning shaft 161 may be increased as much as possible within a range that enables appropriate engagement with the globoidal cam 163 to reduce the distance between adjacent cam followers 162 so that more precise positioning can be performed.

Second Embodiment

Next, a turret tool rest according to a second embodiment of the present invention will be described in outline with reference to FIGS. 10 to 13.

Figure 10:
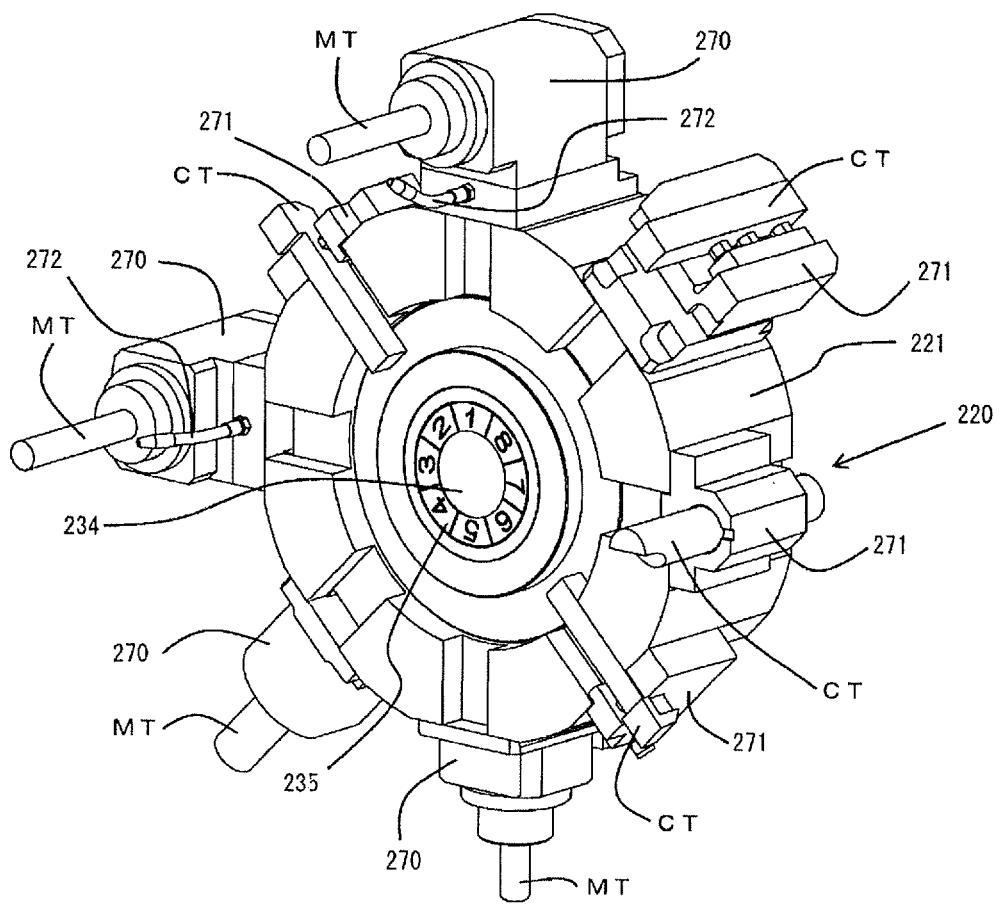
FIG. 10 is a perspective view showing an even 8-station turret which is applied to a turret tool rest according to a second embodiment in outline.

FIG. 10 is a perspective view showing a turret 220 which is applied to the turret tool rest according to the second embodiment in outline.

In the first embodiment, as shown in FIG. 5, the "even 12-station turret" provided with the twelve attachment holes has been described as an example.

On the other hand, the turret 220 shown in FIG. 10 includes a side part 221 and a bottom part (located on the back side in FIG. 10 and thus not shown in FIG. 10), and eight attachment holes (not shown) for attaching a mill holder 270 or a turning holder 271 are formed on the side part 221.

In this specification, a turret of a type shown in FIG. 10 is referred to as an "even 8-station turret".

The mill holder 270 includes a type in which a milling tool MT is radially attached to the turret 220 in the radial direction of the turret 220 and a type in which a milling tool MT is attached to the turret 220 in a direction perpendicular to the radial direction, similarly to the even 12-station turret shown in FIG. 5.

The mill holder 270 is provided with an input shaft (not shown) which inputs torque from a tool main shaft 151, a rotation mechanism (not shown) which transmits the input torque to the milling tool MT, and a nozzle 272 which jets a coolant to the vicinity of a processing point of the milling tool MT.

When the input shaft (not shown) of the mill holder 270 is coupled to a second bevel gear 153 of a tool rotating system 150, the milling tool MT rotates. Then, the rotating milling tool MT is brought into contact with a workpiece W to perform milling on the workpiece W.

The turning holder 271 includes fixing means for attaching a turning tool CT, and, similarly to the mill holder 270, includes a flow path formed inside the turning holder 271 and a jet port which jets a coolant flowing through the flow path.

Various fixing means such as holding means, for example, a vise or a clamp jig and mechanical fixing means, for example, bolting may be employed.

The turning holder 271 includes a type in which a turning tool CT is radially attached to the turret 220 in the radial direction of the turret 220 and a type in which a turning tool CT is attached to the turret 220 in the direction perpendicular to the radial direction. All the turning holders 271 hold the turning tools CT in a direction facing the workpiece W.

Then, the workpiece W is attached to the chuck 3a shown in FIGS. 1 and 2, and the turning tool CT is brought into contact with the workpiece W while rotating the workpiece W by the workpiece rotating device 3b to perform turning on the workpiece W.

Similarly to the even 12-station turret shown in FIG. 5, a mill housing (not shown) is housed inside the side part 221 of the turret 220. A cover plate 234 is attached to the front face on the front side in the drawing of the mill housing.

The cover plate 234 has a function of preventing an object from entering the mill housing. A tool number display plate 235 which has numbers 1 to 8 applied to the positions of the respective tools is attached to the outer side of the cover plate 234.

Similarly to the even 12-station turret, in the tool number display plate 235, an illuminator may be disposed on the rear face of the part having the numbers to display a number of the tool that is currently subjected to processing or coupled to the tool main shaft 151 by lighting in real time.

Figure 11:
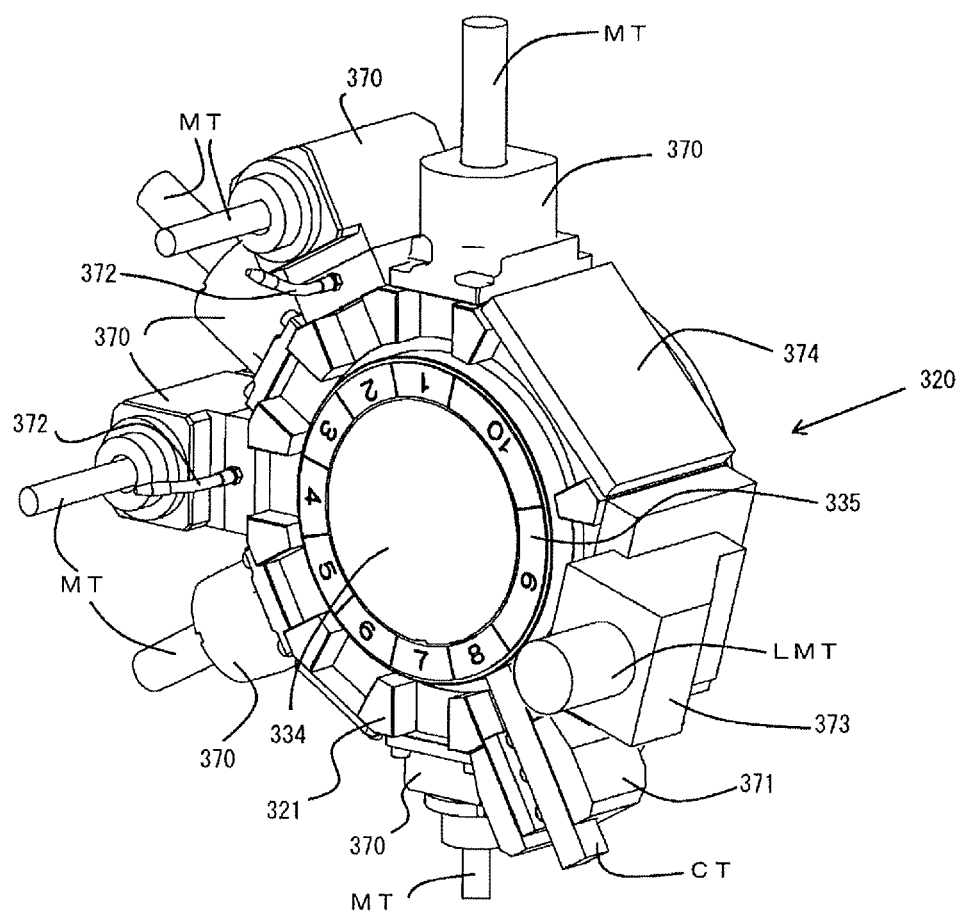
FIG. 11 is a perspective view showing an uneven turret which is provided with a large mill holder or a large turning holder and applied to the turret tool rest according to the second embodiment in outline.

FIG. 11 is a perspective view showing a turret 320 which is provided with a large mill holder or a large turning holder and applied to the turret tool rest according to the second embodiment in outline.

The turret 320 shown in FIG. 11 includes a side part 321 and a bottom part (located on the back side in FIG. 11 and thus not shown in FIG. 11). A plurality of attachment holes (not shown) for attaching a mill holder 370 or a turning holder 371 are formed on the side part 321.

As shown in FIG. 11, the mill holder 370 for attaching a milling tool MT is provided with an input shaft which inputs torque from the tool main shaft 151, a rotation mechanism which transmits the input torque to the milling tool MT, and a nozzle 372 which jets a coolant to the vicinity of a processing point of the milling tool MT.

On the other hand, the turning holder 371 for attaching a turning tool CT includes fixing means for attaching the turning tool CT, and, similarly to the mill holder 370, includes a flow path formed inside the turning holder 371 and a jet port which jets a coolant flowing through the flow path.

In these points, the turret 320 has a configuration in common with the turret shown in FIG. 5 or 10.

On the other hand, a large mill holder 373 which is provided with a large milling tool LMT having a larger diameter or a longer length than a normal one is attached to the turret 320 shown in FIG. 11.

The large mill holder 373 is provided with, inside thereof, a rotation mechanism that is larger than the rotation mechanism of the normal mill holder for rotating the large milling tool LMT. Thus, the large mill holder 373 itself has a large size.

The larger mill holder 373 has a larger width than the normal mill holder, for example, shown in FIG. 5 or 10. Thus, as shown in FIG. 11, it is necessary to ensure a larger attachment region in the side part 321 of the turret 320. Further, the position of an attachment hole which receives an input shaft of the large mill holder 373 deviates from the center (in this specification, referred to as a "virtual center line") of the attachment hole of the normal mill holder.

When the turret 320 is applied, the indexing angles of the turret with respect to the mill housing described in the first embodiment are not equal intervals, that is, not equal angles. Thus, in a tool selecting operation performed by the NC control device, special control for the turret rotation is required.

In the turret 320 shown in FIG. 11, two regions to each of which the large mill holder 373 or a large turning holder (not shown) is attached are provided. A dummy plate 374 is attached to one of the two attachment holes.

A cover plate 334 is attached to the center of the turret 320. A tool number display plate 335 which has numbers 1 to 10 applied to the positions of the respective tools is attached to the outer side of the cover plate 334.

In this specification, a turret of a type shown in FIG. 11 is referred to as an "uneven turret".

Figure 12:
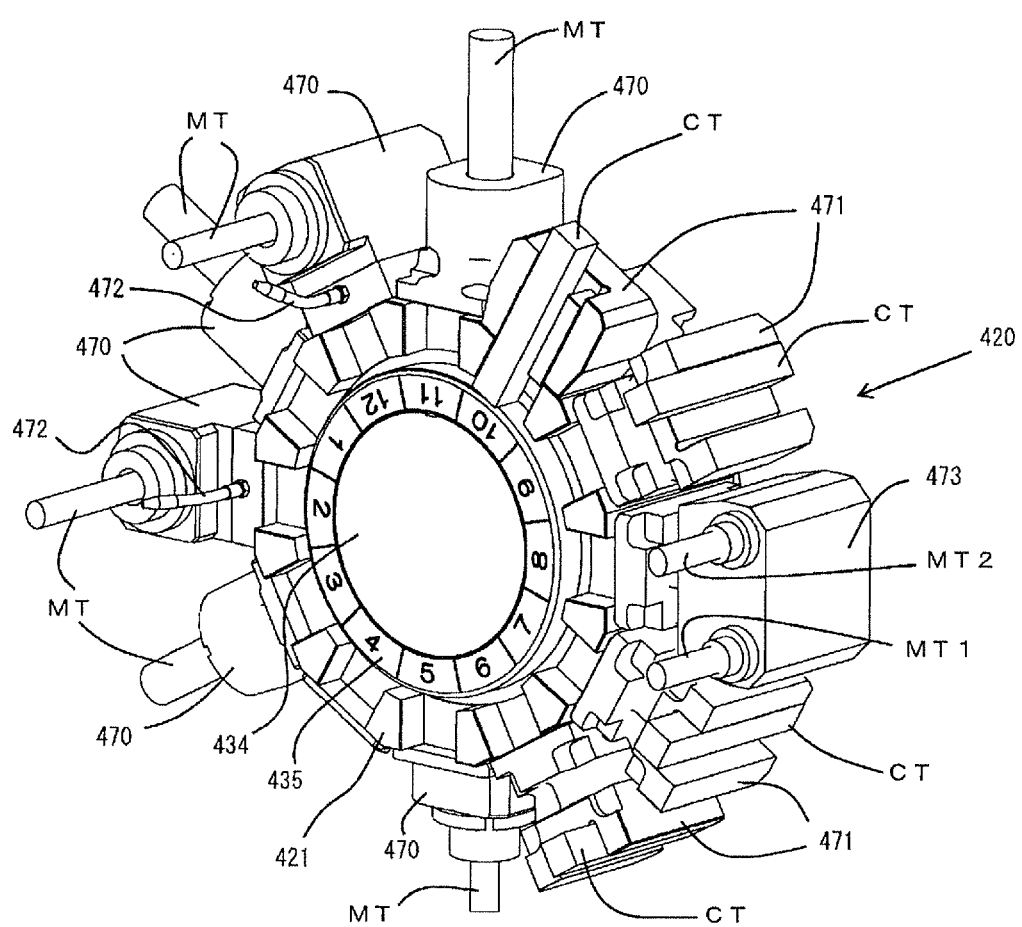
FIG. 12 is a perspective view showing a tandem even turret which is provided with a tandem mill holder and applied to the turret tool rest according to the second embodiment.

FIG. 12 is a perspective view showing a turret 420 which is provided with a tandem mill holder and applied to the turret tool rest according to the second embodiment in outline.

The turret 420 shown in FIG. 12 includes a side part 421 and a bottom part (located on the back side in FIG. 12 and thus not shown in FIG. 12). A plurality of attachment holes (not shown) for attaching a mill holder 470 or a turning holder 471 are formed on the side part 421.

As shown in FIG. 12, the mill holder 470 for attaching a milling tool MT is provided with an input shaft which inputs torque from the tool main shaft 151, a rotation mechanism which transmits the input torque to the milling tool MT, and a nozzle 472 which jets a coolant to the vicinity of a processing point of the milling tool MT.

On the other hand, the turning holder 471 for attaching a turning tool CT includes fixing means for attaching the turning tool CT, and, similarly to the mill holder 470, includes a flow path formed inside the turning holder 471 and a jet port which jets a coolant flowing through the flow path.

In these points, the turret 420 has a configuration in common with the turret shown in FIG. 5 or 10.

On the other hand, a tandem mill holder 473 which is capable of performing milling while simultaneously rotating two milling tools MT at the position of one attachment hole is attached to the turret 420 shown in FIG. 12.

The tandem mill holder 473 is provided with, inside thereof, a rotation mechanism (not shown) which divides torque from one input shaft into two lines so that two milling tools MT1 and MT2 can be rotated by two output shafts.

When the turret 420 is applied, the tip positions of the milling tools MT1 and MT2 attached to the tandem mill holder 473 deviate from the center (virtual center line) of the attachment hole of the turret 420. Thus, in a tool selecting operation performed by the NC control device, special control for the turret rotation is required.

A cover plate 434 is attached to the center of the turret 420. A tool number display plate 435 which has numbers 1 to 12 applied to the positions of the respective tools is attached to the outer side of the cover plate 434.

In this specification, a turret of a type shown in FIG. 12 is referred to as a "tandem even turret".

Further, in this specification, a holder that has a size and a shape different from the size and the shape of the normal mill holder 170 or the normal turning holder 171 shown in FIG. 5 such as the large mill holder 373 shown in FIG. 11 or the tandem mill holder 473 shown in FIG. 12 is referred to as a "special tool holder".

Next, an example of tool positioning control in processing using the turret tool rest that includes the special tool holder according to the second embodiment will be described with reference to FIGS. 13 and 14.

Figure 13:
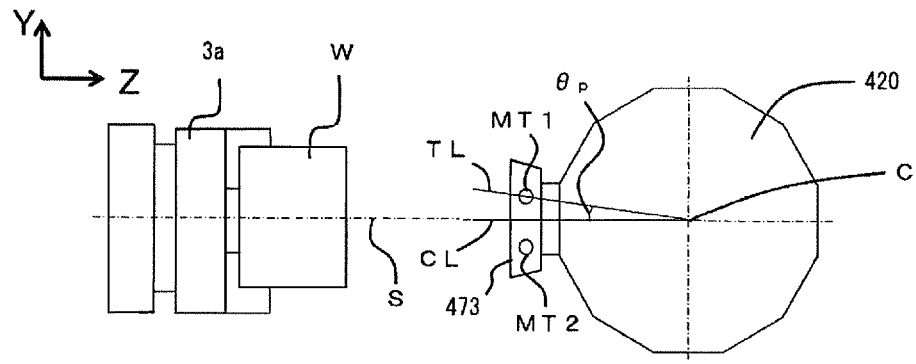
FIG. 13 is a schematic diagram showing the tip positions of milling tools which are attached to the tandem mill holder in the turret tool rest to which the tandem even turret is applied.

FIG. 13 is a schematic diagram showing the tip positions of the milling tools MT1 and MT2 which are attached to the tandem mill holder 473 in the turret tool rest to which the tandem even turret 420 is applied.

In the following description, holders attached to the turret such as the "mill holder", the "turning holder" and the "special tool holder" are referred to as "various holders".

FIG. 13 shows a state in which the turret 420 and the vicinity thereof are viewed from a side at which the turret 420 is located in the X direction of the machine tool 1 shown in FIG. 1.

In FIG. 13, the turret 420 has twelve tool attachment positions. Here, the tandem mill holder 473 attached to only one of the tool attachment positions will be described.

As shown in FIG. 13, in the tandem even turret 420 with the tandem mill holder 473 attached, when the virtual center line (the center of the attachment hole) CL is positioned at the original position of the turret, the tips of the two milling tools MT1 and MT2 are located on the circumference of the same circle centered at a rotation center C of the tandem even turret 420 as well as on tool attachment lines TL each of which deviates from the virtual center line CL by an offset angle θp.

Thus, when processing is performed using a tool attached to a special tool holder such as the tandem mill holder 473, it is necessary to perform positioning of the tool to the processing starting point taking into consideration the deviation of the tip position of the tool by the offset angle θp.

As described above, the machine tool to which the turret tool rest according to the second embodiment of the present invention is applied is provided with the NC control device which controls the drive of the turret tool rest or the workpiece holding device.

The NC control device is provided with a control unit which controls the operation of the entire machine tool on the basis of various processing programs and a tool data memory. The tool data memory stores tool data that includes turret numbers, identification numbers of various holders, tool tip positions in various holders, and tool offset angles.

When the NC control device performs the above processing program, the NC control device reads necessary information from the tool data memory to perform the processing, and issues a command of a processing operation to the machine tool.

Figure 14:
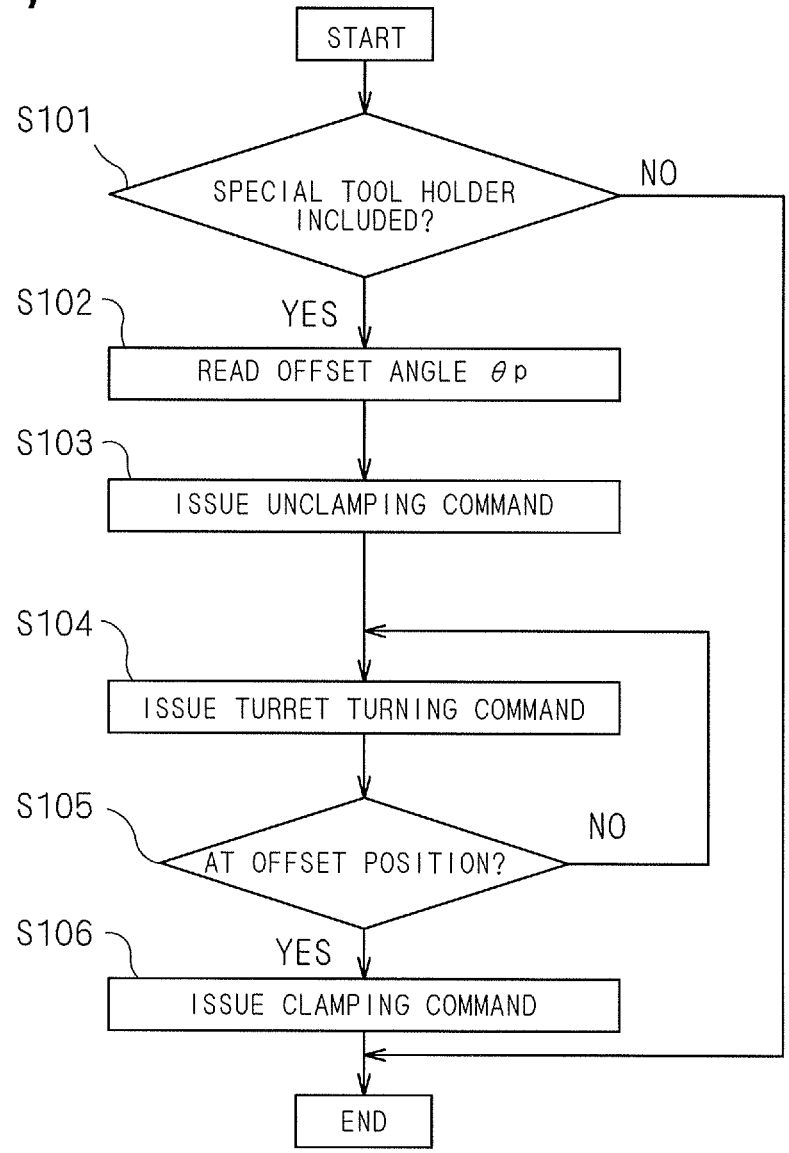
FIG. 14 is a flow chart of a positioning program for performing an operation of positioning a milling tool attached to the tandem mill holder in the tandem even turret shown in FIG. 13 to a processing starting point.

FIG. 14 is a flow chart of a positioning program for performing an operation of positioning the milling tool MT attached to the tandem mill holder 473 in the tandem even turret 420 shown in FIG. 13 to the processing starting point.

Before the positioning program is performed, the indexing operation of the mill holder and the coupling between the input shaft of the mill holder and the second bevel gear of the tool rotating system shown in FIGS. 6A, 6B and 9A to 9C are previously performed.

For example, when milling is performed using the milling tool MT1 attached to the tandem mill holder 473 of the tandem even turret 420 shown in FIG. 12, the control unit of the NC control device first determines whether the turret currently attached to the turret tool rest includes a special tool holder (step S101).

The determination is performed by detecting and identifying a characteristic part of the shape of the turret using a sensor or is performed on the basis of the turret numbers or the identification numbers of various holders stored in the tool data memory.

When the determination is "No" in step S101, the currently attached turret is determined to be an even turret that includes a normal mill holder or a normal turning holder, and the program is finished.

On the other hand, when the determination is "Yes" in step S101, the control unit reads an offset angle θp of a tool that corresponds to a type of the currently attached turret from the tool data memory (step S102).

At this time, the control unit identifies that the type of the turret is, for example, a tandem even turret at the point of step S101. Thus, the control unit refers to the turret number of the tandem even turret and the identification numbers of various holders to extract an offset angle θp of the corresponding tool.

Then, the control unit issues a command for stopping the operation of the sleeve 114 which clamps the turret turning shaft 161 shown in FIGS. 4A to 4C to release the clamp to the turret turning shaft 161 (step S103).

Then, the control unit issues a command for moving the piston 180 of the engagement mechanism to the second position to couple and fix the joint base 140 and the turret turning shaft 161 to each other and driving the turret turning motor 164 to rotate the globoidal cam 163 to rotate the turret turning shaft 161 in a direction corresponding to the offset angle θp (step S104).

Accordingly, the tandem even turret 420 shown in FIG. 13 can turn while rotating the milling tools MT1 and MT2.

Then, the control unit detects a rotation angle of the turret caused by the turn of the turret turning shaft 161 and determines whether an integrated value of the rotation angle coincides with the offset angle θp, that is, whether the turret has reached a position that requires offset by the rotation of the turret (step S105).

When the determination is "No" in step S105, the rotation angle of the turret is determined not to have reached the offset angle θp and a return to step S104 is made.

On the other hand, when the determination is "Yes" in step S105, the rotation angle of the turret is determined to have reached the offset angle θp and the turret turning command is stopped.

Then, the control unit issues a command for causing the sleeve 114 to operate to clamp the whole circumference of the turret turning shaft 161 (step S106), and finishes the positioning program.

The milling tool MT1 attached to the tandem mill holder 473 is positioned at a predetermined processing starting point by performing the operation of the above flow chart.

Then, milling in the Z direction shown in, for example, FIGS. 8A to 8C is performed from the processing starting point.

In the positioning control shown in FIGS. 13 and 14, a case in which the two milling tools MT1 and MT2 attached to the tandem mill holder 473 are located at positions rotated on the circumference of the same circle from the virtual center line CL has been described as an example.

On the other hand, when the milling tools MT1 and MT2 are not located on the above circumference of the circle, for example, the rotation control and the movement control by the Z-axis rail of the turret as shown in FIGS. 3A and 3B may be combined to perform positioning of the tools to the processing starting point.

When, for example, the three-dimensional milling as shown in FIGS. 9A to 9C is performed, the control unit again stops the operation of the sleeve 114 to release the clamp to the turret turning shaft 161.

Accordingly, it is possible to perform the Y-direction position control as shown in FIGS. 3A and 3B by rotating the tandem even turret 420 while maintaining the rotation of the milling tool MT1 and to perform the three-dimensional position control of the tool tip by combining the translations on the X-axis rail and the Z-axis rail with the position control in the Y direction.

The turret tool rest according to the second embodiment of the present invention and the machine tool provided with the turret tool rest make it possible to perform the tool positioning control in processing not only by a normal even turret, but also by a turret that includes a special tool holder that has a tool attached to a position offset from the virtual center line of the holder (an uneven turret or a tandem even turret).

Since various kinds of turrets can be applied, the shape and the size of a tool can have many variations. As a result, it is possible to expand processing uses of the machine tool.

Third Embodiment

Next, a turret tool rest according to a third embodiment of the present invention will be described with reference to FIGS. 15 and 16.

Figure 15:
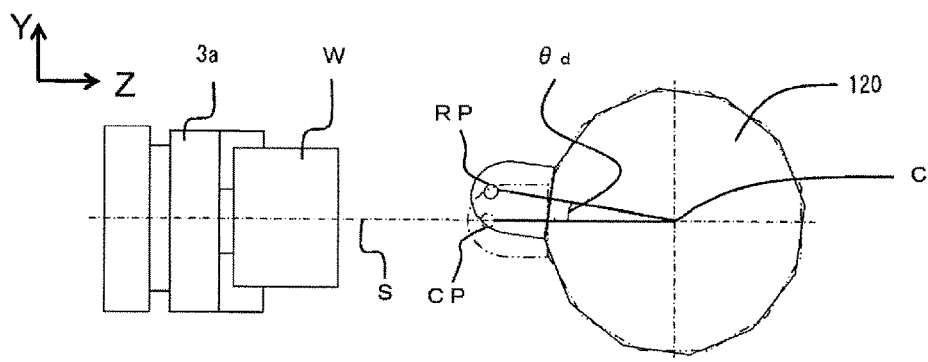
FIG. 15 is a schematic diagram showing a position deviation of a tool in a machine tool to which a turret tool rest which has an even turret according to a third embodiment is applied.

FIG. 15 is a schematic diagram showing position deviation of a tool in a machine tool to which the turret tool rest that includes an even turret 120 is applied.

FIG. 15 shows a state in which the turret 120 and the vicinity thereof are viewed from a side at which the turret 120 is located in the X direction of the machine tool 1 shown in FIG. 1. A two-dot chain line indicates a position of the tool on the turret 120 corresponding to a command value of a control unit, and a solid line indicates a position of the tool on the turret 120 corresponding to an actual detected value.

In FIG. 15, the turret 120 has twelve tool attachment positions. Here, the tool attached to only one of the tool attachment positions will be described.

For example, when the turret 120 is returned to the original position and the power of the machine tool is turned off after processing performed by the machine tool is finished, and the power of the machine tool is again turned on to activate the machine tool after a certain time (in the next morning, for example), the sleeve 114 which clamps the whole circumference of the turret turning shaft 161 shown in FIGS. 4A to 4C may be released due to some reasons when the power is in an off state, which may cause the rotation of the turret turning shaft 161 and the turret 120.

In this case, since the turret that should be located at the original position rotates, an actual (detected) tool position RP deviates by a deviation angle θd from a tool position CP based on the command.

Thus, the machine tool provided with the turret tool rest according to the third embodiment of the present invention has a function of correcting the position deviation of the tool when the turret 120 is in a standby state by control using a correction program of an NC control device of the machine tool.

Figure 16:
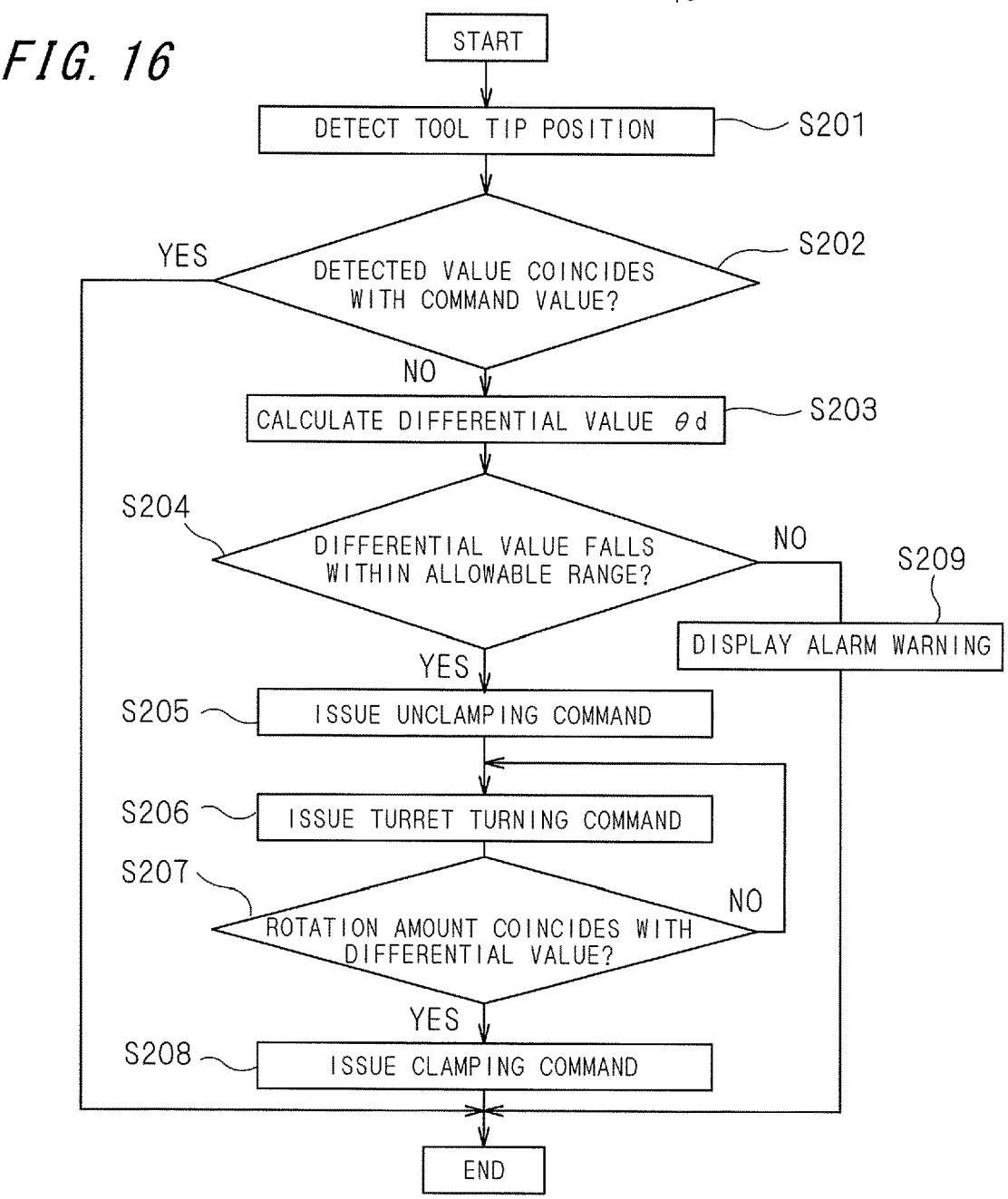
FIG. 16 is a flow chart of a correction program for correcting the position deviation of the tool position in the turret shown in FIG. 15.

FIG. 16 is a flow chart of the correction program for correcting the position deviation of the tool position in the turret 120 shown in FIG. 15.

When the correction program is performed, the piston 180 of the engagement mechanism shown in FIGS. 6A and 6B is located at the second position, and the mill housing connection shaft 133 fixed to the joint base 140 and the turret turning shaft 161 are relatively rotatable.

When the position deviation of the tool as shown in FIG. 15 occurs and the correction program for correcting the position deviation is performed, the control unit of the NC control device first detects a current tip position of the tool (step S201).

In the operation of detecting the current tip position of the tool, the current tip position can be read, for example, from a rotation amount of the turret turning motor 164 which rotates the globoidal cam 163 shown in FIGS. 4B and 4C or a value of an encoder attached to the turret turning motor.

A sensor (angle detector) which detects a representative position of the turret 120 may be disposed on the turret tool rest to obtain the tip position of the tool from a detected value of the representative position.

Then, the control unit determines whether the detected value of the tip position of the tool detected in step S201 coincides with a command value commanded at last (the original position in the example of FIG. 15) (step S202).

When the determination is "Yes" in step S202, the control unit determines that there is no inconsistency between the command value and the detected value of the position of the currently attached tool and a normal condition is thus present, and finishes the program.

On the other hand, when the determination is "No" in step S202, the control unit calculates a differential value (the angle θd shown in FIG. 15) between the detected value and the command value (step S203).

Specifically, the differential value is calculated by subtracting the command value (the rotation angle of the original position, for example) from the detected value (that is, the rotation angle of the tip position of the tool) that is currently held by the control unit.

At this time, a deviation direction of the rotation angle can be obtained from a plus or minus sign of the differential value.

Then, the control unit determines whether the absolute value of the differential value θd calculated in step S203 falls within a predetermined allowable range (that is, a predetermined threshold or less) (step S204).

When the determination is "No" in step S204, the calculated differential value θd (that is, a deviation amount of the rotation angle of the turret) is determined to be an abnormal value, and the control unit issues a command for giving alarm warning to an operator using, for example, display means or alarm means (not shown) (step S209).

Then, upon confirming the alarm warning, the operator visually checks whether there is any structural failure in the turret tool rest and performs repair or correction as necessary.

On the other hand, when the determination is "Yes" in step S204, the control unit determines that the deviation of the rotation angle can be automatically corrected, and issues a command for stopping the operation of the sleeve 114 which clamps the turret turning shaft 161 shown in FIGS. 4A to 4C to release the clamp to the turret turning shaft 161 (step S205).

Then, the control unit issues a command for moving the piston 180 of the engagement mechanism to the second position to couple and fix the joint base 140 and the turret turning shaft 161 to each other and driving the turret turning motor 164 to rotate the globoidal cam 163 to make the differential value θd zero, that is, to rotate the turret turning shaft 161 in a direction opposite to the deviation direction (step S206).

Then, the control unit detects a rotation angle of the turret caused by the turn of the turret turning shaft 161 and determines whether an integrated value of the rotation angle (a rotation amount of the turret) coincides with the absolute value of the differential value θd, that is, the turret has rotated by a rotation amount that enables the differential value θd to be zero (step S207).

When the determination is "No" in step S207, the control unit determines that the position deviation of the tool has not yet been corrected, and returns to step S206.

On the other hand, when the determination is "Yes" in step S207, the control unit determines that the turret turning shaft 161 has rotated by an amount corresponding to the absolute value of the differential value θd and the position deviation of the tool has been corrected, and stops the turret turning command.

Then, the control unit issues a command for causing the sleeve 114 to operate to clamp the whole circumference of the turret turning shaft 161 (step S208) and finishes the correction program.

The position deviation of the tip position of the tool attached to the turret 120 is eliminated and the tip position of the tool is correctly positioned in the turret tool rest by performing the operation of the above flow chart.

Then, various processings such as turning and milling, for example, shown in FIGS. 7A to 9C are performed using the positioned tool.

In the tool position deviation correction program shown in FIGS. 15 and 16, when the absolute value of the differential value θd between the command value and the detected value of the tool position does not fall within the predetermined allowable range, the alarm warning display is performed in step S209 and the program is then finished.

In this case, since no processing is performed during the execution of the correction program, the drive of the machine tool is stopped along with the finish of the program.

On the other hand, in the correction program, an operator may operate predetermined input means (for example, a tool selection button such as an icon of a touch panel display device or a switch of a control panel) to input a correction command after the alarm warning display in step S209 to thereby break into the steps following step S205 to make the control unit perform a correction operation.

In the example shown in FIGS. 15 and 16, the position deviation of the tool that occurs when the power is turned on to start the machine tool has been described as an example. However, the third embodiment is not limited to this case.

For example, also when a position deviation of the turret or the tool occurs due to an unexpected impact during the processing or suspension, correction of the position deviation can be performed by executing the above correction program.

With the turret tool rest according to the third embodiment of the present invention and the machine tool provided with the turret tool rest, even when a position deviation occurs between the command value and the current detected value of the tip position of the tool attached to the turret 120 due to some reasons, the control unit can automatically correct the position deviation to position the tool tip at the correct position.

Further, since it is possible to perform processing while correcting the position deviation of the tool to the normal position, a deterioration of the processing accuracy or the generation of a defective item can be prevented.

The present invention is not limited to the configurations of the above embodiments and includes various modifications.

For example, there has been described, as an example, a configuration in which the plurality of cam followers which are disposed on the outer periphery of the turret turning shaft at equal intervals and the globoidal cam which applies a feed to the cam followers are used as a mechanism for rotating the turret turning shaft of the turret turning system in the turret tool rest of the embodiment of the present invention. Alternatively, various configurations capable of rotating the turret turning shaft such as a gear mechanism, and a worm and a worm wheel mechanism may be employed.

There been described, as an example, a configuration in which the piston is moved between the first position and the second position inside the pressure chamber as the engagement member in the engagement mechanism for coupling the joint base to the turret base or the turret turning shaft. Alternatively, mechanical means using a member which presses a piston or contactless means using an electric field or a magnetic field may be employed as movement means for moving a piston.

Another engagement member that is capable of switching the coupling between the joint base and the turret base and the coupling between the joint base and the turret turning shaft such as a hook may be employed instead of the piston of the engagement mechanism.

The turret tool rest of the embodiment of the present invention includes a main shaft for rotating a tool, a mill housing including a mill housing connection shaft into which the main shaft is inserted, a turret turning shaft into which the mill housing connection shaft is inserted, a turret to which one end of the turret turning shaft is fixed, a joint base fixed to one end of the mill housing connection shaft, and a turret base configured to support the turret turning shaft. The mill housing is disposed inside the turret, and the joint base includes an engagement mechanism configured to switch between coupling to the turret base and coupling to the turret turning shaft.

In the turret tool rest of the embodiment of the present invention, the engagement mechanism includes an engagement member movable back and forth from the joint base.

In this case, the engagement member is displaced between a first position coupled to the turret turning shaft and a second position coupled to the turret base in the joint base.

In another aspect of the turret tool rest of the embodiment of the present invention, the joint base includes a coolant block configured to supply a coolant to the turret, and the turret further includes a flow path configured to allow the coolant supplied from the coolant block to flow therethrough.

Further, the turret tool rest further includes a plurality of cam followers radially disposed on an outer peripheral face of the turret turning shaft at predetermined intervals, a globoidal cam configured to be engaged with the cam followers to apply a feed in a rotation direction of the turret turning shaft to the cam followers, and a turret turning motor configured to rotate the globoidal cam.

In this case, the turret turning motor is preferably a servo motor.

The turret tool rest of the embodiment of the present invention can be applied to a machine tool including a workpiece holding device configured to hold a workpiece and an NC control device configured to control drive of the turret tool rest and the workpiece holding device.

The machine tool has a first axis in a direction in which the turret tool rest and the workpiece holding device move close to or separate from each other, a second axis in which the turret tool rest is moved back and forth in a direction perpendicular to the first axis, and a third axis perpendicular to both the first axis and the second axis, and the NC control device combines control of a position of the turret tool rest in the first axis and control of a rotation angle of the turret of the turret tool rest to control a tip position of the tool in the third axis.

In this case, the turret turning motor of the turret tool rest preferably has a function of detecting a rotation angle of the turret from an original position.

In the machine tool, the turret may further include a special tool holder in which a tip of the tool is located at a position deviated by a predetermined offset angle from a virtual center line of any one of tool attachment positions defined by equally dividing the turret, and the NC control device may perform, when processing is performed using a tool attached to the special tool holder, positioning of a processing starting point of the tool by setting a rotation angle of the turret to an angle obtained by adding the offset angle to a rotation angle of the virtual center line.

Further, the NC control device may include a tool data memory configured to store tool data including turret numbers, identification numbers of various holders, and tip positions of tools in the various holders, the tool data memory may further include data of the offset angle for the special tool holder, and the NC control device may perform, when processing is performed using a tool attached to the special tool holder, positioning of a processing starting point of the tool by reading the offset angle from the tool data memory.

In the machine tool, the NC control device may compare a command value of a rotation angle to the turret with a detected value of a rotation angle detected in the turret turning motor, and may issue a correction command for calculating a differential value between the command value and the detected value and making the differential value zero on the basis of the differential value when the command value and the detected value do not coincide with each other.

In this case, the NC control device may stop drive of the turret tool rest and the workpiece holding device and perform warning display when the differential value exceeds a preset allowable range.

The turret tool rest of the embodiment of the present invention and the machine tool provided with the turret tool rest having the above structure make it possible to eliminate a weight increase and a processing complexity with a simple structure and to perform processing control in the Y-axis direction by turning the turret while rotating one milling tool selected from among milling tools held in all mill holders attached to the holder attaching faces of the turret.

Further, it is possible to perform positioning control for a tool in processing performed by not only a normal even turret, but also by a turret having a special tool holder in which a tool is attached to a position offset from the virtual center line of the holder (an uneven turret or a tandem even turret). As a result, processing uses of the machine tool can be expanded.

Even when a position deviation occurs between a command value and a current detected value of the tip position of a tool attached to the turret, the control unit can automatically correct the position deviation to perform processing while correcting the position deviation of the tool to a normal position. Thus, it is possible to reduce a deterioration of the processing accuracy and the generation of a defective item.

Obviously, numerous modifications and variations of the present invention are possible in light of the above teachings. It is therefore to be understood that within the scope of the appended claims, the invention may be practiced otherwise than as specifically described herein.

What is claimed is:

1. A turret tool rest comprising:
   a main shaft for rotating a tool;
   a mill housing comprising a mill housing connection shaft into which the main shaft is inserted;
   a turret turning shaft into which the mill housing connection shaft is inserted;
   a turret to which one end of the turret turning shaft is fixed;
   a joint base fixed to one end of the mill housing connection shaft;
   a turret base configured to support the turret turning shaft; and
   a sleeve provided between the turret base and the turret turning shaft and configured to grip an outer cylindrical surface of the turret turning shaft without the turret turning shaft being slid in an axial direction along an axis of rotation of the turret turning shaft to prevent turning of the turret, the sleeve being attached to the turret base such that the sleeve is not rotatable with respect to the turret base regardless of whether or not the sleeve prohibits the turning of the turret,
   wherein the mill housing is disposed inside the turret,
   wherein the joint base comprises an engagement mechanism, which includes a piston, the piston having a longitudinal center axis, the longitudinal center axis being radially offset from the axis of rotation of the turret turning shaft, and
   the piston being movable back and forth in a direction that extends parallel the longitudinal center axis for switching between coupling to the turret base and coupling to the turret turning shaft.

2. The turret tool rest according to claim 1, wherein the piston is movable back and forth from the joint base.

3. The turret tool rest according to claim 2, wherein the piston is displaced between a first position coupled to the turret turning shaft and a second position coupled to the turret base in the joint base.

4. The turret tool rest according to claim 3, wherein
   the joint base comprises a coolant block configured to supply a coolant to the turret, and
   the turret comprises a flow path configured to allow the coolant supplied from the coolant block to flow therethrough.

5. The turret tool rest according to claim 3, further comprising:
  a plurality of cam followers radially disposed on the outer cylindrical surface of the turret turning shaft at predetermined intervals about the axis of rotation of the turret turning shaft;
  a globoidal cam configured to be engaged with the plurality of cam followers to apply a feed in a rotation direction of the turret turning shaft to the plurality of cam followers; and
  a turret turning motor configured to rotate the globoidal cam.

6. A machine tool, comprising:
  the turret tool rest according to claim 5;
  a workpiece holder configured to hold a workpiece; and
  an NC control device configured to control drive of the turret tool rest and the workpiece holder,
  wherein the machine tool has a first axis in a direction in which the turret tool rest and the workpiece holder move close to or separate from each other, a second axis in which the turret tool rest is moved back and forth in a direction perpendicular to the first axis, and a third axis perpendicular to both the first axis and the second axis, and
  the NC control device combines control of a position of the turret tool rest in the first axis and control of a rotation angle of the turret of the turret tool rest to control a tip position of the tool in the third axis.

7. The turret tool rest according to claim 1, further comprising:
  a plurality of cam followers radially disposed on the outer cylindrical surface of the turret turning shaft at predetermined intervals about the axis of rotation of the turret turning shaft;
  a globoidal cam configured to be engaged with the plurality of cam followers to apply a feed in a rotation direction of the turret turning shaft to the plurality of cam followers; and
  a turret turning motor configured to rotate the globoidal cam.

8. The turret tool rest according to claim 7, wherein the turret turning motor includes a servo motor.

9. A machine tool, comprising:
  the turret tool rest according to claim 1;
  a workpiece holder configured to hold a workpiece; and
  an NC control device configured to control drive of the turret tool rest and the workpiece holder,
  wherein the machine tool has a first axis in a direction in which the turret tool rest and the workpiece holder move close to or separate from each other, a second axis in which the turret tool rest is moved back and forth in a direction perpendicular to the first axis, and a third axis perpendicular to both the first axis and the second axis, and
  the NC control device combines control of a position of the turret tool rest in the first axis and control of a rotation angle of the turret of the turret tool rest to control a tip position of the tool in the third axis.

10. The machine tool according to claim 9, wherein the turret turning motor of the turret tool rest has a function of detecting a rotation angle of the turret from an original position.

11. The machine tool according to claim 10, wherein the turret comprises a tool holder in which a tip of the tool is located at a position deviated by a predetermined offset angle from a virtual center line of any one of tool attachment positions defined by equally dividing the turret, and
  the NC control device performs, when processing is performed using the tool attached to the tool holder, positioning of a processing starting point of the tool by setting a rotation angle of the turret to an angle obtained by adding the offset angle to a rotation angle of the virtual center line.

12. The machine tool according to claim 11, wherein
  the NC control device comprises a tool data memory configured to store tool data including turret numbers, identification numbers of a plurality of holders, and tip positions of tools in the plurality of holders,
  the tool data memory includes data of the offset angle for the tool holder, and
  the NC control device performs, when processing is performed using the tool attached to the tool holder, positioning of a processing starting point of the tool by reading the offset angle from the tool data memory.

13. The machine tool according to claim 12, wherein the NC control device compares a command value of a rotation angle to the turret with a detected value of a rotation angle detected in the turret turning motor, and issues a correction command for calculating a differential value between the command value and the detected value and making the differential value zero on the basis of the differential value when the command value and the detected value do not coincide with each other.

14. The machine tool according to claim 13, wherein the NC control device stops drive of the turret tool rest and the workpiece holder and performs a warning display when the differential value exceeds a preset allowable range.

15. The turret tool rest according to claim 1, wherein the longitudinal center axis extends parallel to the axis of rotation of the turret turning shaft.

16. The turret tool rest according to claim 1, further comprising:
  a tool rotating motor provided on the turret base and separated from the joint base, the tool rotating motor being configured to generate torque;
  a drive line connecting the tool rotating motor and the main shaft to transmit the torque from the tool rotating motor to the main shaft.

17. A turret tool rest comprising:
  a main shaft to rotate a tool;
  a mill housing connection shaft into which the main shaft is inserted;
  a turret turning shaft into which the mill housing connection shaft is inserted, said turret turning shaft having a first coupling hole;
  a turret connected to the turret turning shaft via which the turret is rotated;
  a turret base configured to support the turret turning shaft, the turret base having a sub-base in which a second coupling hole is formed;
  a joint base fixed to one end of the mill housing connection shaft and provided between the first coupling hole and the second coupling hole in an axial direction along an axis of rotation of the turret turning shaft, each of the mill housing connection shaft, the joint base, the main shaft, and the turret turning shaft being disposed to rotate about a rotation axis of the turret; and
  an engagement member that moves axially so as to be able to engage either the first coupling hole or the second coupling hole, wherein when the engagement member is engaged with the first coupling hole, the turret together with the joint base and the turret turning shaft are rotatable with respect to the turret base, and when the engagement member is engaged with the second coupling hole, the turret together with the turret turning shaft are rotatable with respect to the joint base.

18. The turret tool rest according to claim 17, wherein the engagement member is a piston, an entirety of the piston having a center axis, the center axis being offset from an axis of rotation of the turret turning shaft in a radial direction perpendicular to the axis of rotation of the turret turning shaft, the piston being movable back and forth along the center axis.

19. The turret tool rest according to claim 18, wherein the center axis is parallel to the axis of rotation of the turret turning shaft.

20. A turret tool rest comprising:
a main shaft for rotating a tool;
a mill housing comprising a mill housing connection shaft into which the main shaft is inserted;
a turret turning shaft into which the mill housing connection shaft is inserted;
a turret to which one end of the turret turning shaft is fixed;
a joint base fixed to one end of the mill housing connection shaft; and
a turret base configured to support the turret turning shaft,
wherein the mill housing is disposed inside the turret,
wherein the joint base comprises an engagement mechanism configured to switch between coupling to the turret base and coupling to the turret turning shaft,
wherein the joint base comprises a coolant block configured to supply a coolant to the turret, and
wherein the turret comprises a flow path configured to allow the coolant supplied from the coolant block to flow therethrough.

* * * * *